US012743233B2

(12) United States Patent
Taylor et al.

(10) Patent No.: US 12,743,233 B2
(45) Date of Patent: *Sep. 22, 2026

(54) ACCUMULATING I/O OPERATIONS OF DATA AND CHECKSUMS INTO A SINGLE COMBINED I/O OPERATION FOR IMPLEMENTATION BY AN UNDERLYING STORAGE DEVICE LAYER

(71) Applicant: NetApp Inc., San Jose, CA (US)

(72) Inventors: James Alastair Taylor, Livermore, CA (US); Suhas Girish Urkude, San Ramon, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/406,767

(22) Filed: Jan. 8, 2024

(65) Prior Publication Data

US 2024/0143234 A1 May 2, 2024

Related U.S. Application Data

(63) Continuation of application No. 17/716,978, filed on Apr. 8, 2022, now Pat. No. 12,073,117.

(51) Int. Cl.
*G06F 3/06* (2006.01)

(52) U.S. Cl.
CPC .......... *G06F 3/0659* (2013.01); *G06F 3/0611* (2013.01); *G06F 3/0673* (2013.01)

(58) Field of Classification Search
CPC ..... G06F 3/0659; G06F 3/0611; G06F 3/0673
See application file for complete search history.

(56) References Cited

U.S. PATENT DOCUMENTS

| | | | |
|---|---|---|---|
| 8,190,784 B1 | 5/2012 | Raizen et al. | |
| 8,244,810 B1 | 8/2012 | Haldar | |
| 8,886,845 B1 | 11/2014 | Clark et al. | |
| 9,495,102 B2 | 11/2016 | Bisht | |

(Continued)

OTHER PUBLICATIONS

Non-Final Office Action mailed on May 16, 2023 for U.S. Appl. No. 17/716,978, filed Apr. 8, 2022, 31 pages.

(Continued)

*Primary Examiner* — Chie Yew
(74) *Attorney, Agent, or Firm* — Jaffery Watson Hamilton & DeSanctis LLP

(57) ABSTRACT

Techniques are provided for combining data block and checksum block I/O into a single I/O operation. Many storage systems utilize checksums to verify the integrity of data blocks stored within storage devices managed by a storage stack. However, when a storage system reads a data block from a storage device, a corresponding checksum must also be read to verify integrity of the data in the data block. This results in increased latency because two read operations are being processed through the storage stack and are being executed upon the storage device. To reduce this latency and improve I/O operations per second, a single combined I/O operation corresponding to a contiguous range of blocks including the data block and the checksum block is processed through the storage stack instead of two separate I/O operations. Additionally, I/O operation may be combined into a single request that is executed upon the storage device.

17 Claims, 15 Drawing Sheets

(56) References Cited

U.S. PATENT DOCUMENTS

| | | | | |
|---|---|---|---|---|
| 9,891,866 | B1 | 2/2018 | Lazier et al. | |
| 10,922,231 | B1 | 2/2021 | Gray et al. | |
| 10,949,289 | B1 | 3/2021 | Monakhov et al. | |
| 11,954,348 | B2 | 4/2024 | Taylor et al. | |
| 12,474,851 | B2 | 11/2025 | Taylor et al. | |
| 2004/0153746 | A1 | 8/2004 | Talagala et al. | |
| 2008/0025126 | A1 | 1/2008 | Jewell et al. | |
| 2008/0282105 | A1 | 11/2008 | Deenadhayalan et al. | |
| 2013/0061110 | A1 | 3/2013 | Zvibel | |
| 2013/0091307 | A1 | 4/2013 | Lai et al. | |
| 2013/0132801 | A1 | 5/2013 | Hafner et al. | |
| 2013/0262398 | A1 | 10/2013 | Gygi et al. | |
| 2014/0229657 | A1 | 8/2014 | Karamov et al. | |
| 2015/0081967 | A1 | 3/2015 | Pan | |
| 2015/0220275 | A1* | 8/2015 | Oh | G06F 3/0679 711/103 |
| 2017/0357572 | A1* | 12/2017 | Okubo | G06F 13/28 |
| 2018/0150220 | A1 | 5/2018 | Pandian et al. | |
| 2019/0087126 | A1 | 3/2019 | Chun | |
| 2019/0146867 | A1* | 5/2019 | Flynn | G06F 12/0253 714/763 |
| 2020/0341915 | A1 | 10/2020 | Lecrone et al. | |
| 2022/0130438 | A1 | 4/2022 | Jung | |
| 2023/0325098 | A1 | 10/2023 | Taylor et al. | |
| 2023/0325115 | A1 | 10/2023 | Taylor et al. | |
| 2024/0256164 | A1 | 8/2024 | Taylor et al. | |

OTHER PUBLICATIONS

Notice of Allowance mailed on Oct. 17, 2023 for U.S. Appl. No. 17/716,978, filed Apr. 8, 2022, 4 pages.
Notice of Allowance mailed on Sep. 1, 2023 for U.S. Appl. No. 17/716,978, filed Apr. 8, 2022, 7 pages.
A2HOSTING., "How to Generate and Verify File Checksums on Linux," Search the KB, Reprinted from the Internet at: https://www.a2hosting.com/kb/developer-corner/linux/working-with-file-checksums/, 9 pages.
Astra Control Services., "Astra Control Service Documentation", Aug. 2022, NetApp, Astra Control Services, Reprinted from the Internet at: https://docs.netapp.com/us-en/astra-control-service/, 114 pages.
Astra-Protect., Application Data Protection, Mobility and Storage for Cloud Native Applications, 2022, Cloud Central, Astra Family, Astra-Protect, Move and Store Your Kubernetes Persistent Data, Reprinted from the Internet at: https://cloud.netapp.com/astra, 8 pages.
FERROUSLEPIDOPTERA., "Scatter Gather List," Everything2.com, 2000, 1 page.
Gao K., et al., "Combining I/O Operations for Multiple Array Variables in Parallel NetCDF," IEEE International Conference on Cluster Computing, 2009, 10 pages.
Hasan F., "How Does Checksum Work?," A Concise Shot of Dev Knowledge, Reprinted from the Internet at: https://www.educative.io/answers/how-does-checksum-work, 5 pages.
Kwon Y., et al., "Turn Your Storage Stack into a File System," 2017, 7 pages.
LIFEWIRE., "What Is a Checksum?", Tim Fisher, Checksum Definition, Examples, and More, Software Apps, Windows, Lifewire Tech for Humans, Feb. 2022, Reprinted from the Internet at: https://www.lifewire.com/what-does-checksum-mean-2625825, 8 pages.
Mark B., "External NetApp Storage for Azure Stack", Nov. 2019, 23 pages.
Moyer B., "How Does Scatter/Gather Work?," Promises of Single-Cycle Access Are True, Butt . . . , EE Journal, 2017, Reprinted from the Internet at: https://www.eejournal.com/article/20170209-scatter-gather/, 14 pages.
Netapp.,"Astra Trident 22.07 documentation", Aug. 12, 2022, https://docs.netapp.comlus-enltridentlindex.html/, 283 pages.
Netapp., "Design and Architecture Guide, Storage Configuration for Trident," 2021, 13 pages. Retrieved from Internet URL: https://netapp-trident.readthedocs.io/en/stable-v21.04/dag/kubernetes/index.html.
NetApp; ONTAP 9 Documentation; ONTAP 9; Aug. 18, 2022; https://docs.netapp.com/us-en/ontap/index.html; 2712 Pgs.
Netapp., "ONTAP Guarantee", Ontap / Performance-admin / Guarantee-throughput-qos-task.adoc, Retrieved on Feb. 6, 2023, 8 pages.
Netapp., "The Key Pillars of the Astra Data Store Architecture", https://cloud.netapp.comibloglastra-big-kubernetes-applications-get-an-enterprise-grade-platform-with-astra-data-store, Apr. 13, 2022, 5 pages.
Netapp.,"Get Started Astra Data Store", Jul. 25, 2022, https://docs.netapp.comlus-enlastra-data-storelgetstartedlrequirements.html/, 41 pages.
Notice of Allowance mailed on Aug. 24, 2023 for U.S. Appl. No. 17/716,977, filed Apr. 8, 2022, 9 pages.
Notice of Allowance mailed on Dec. 8, 2023 for U.S. Appl. No. 17/716,977, filed Apr. 8, 2022, 5 pages.
Notice of Allowance mailed on Oct. 24, 2023 for U.S. Appl. No. 17/716,977, filed Apr. 8, 2022, 2 pages.
Oracle., "Scatter-Gather Access," Programming Interfaces Guide, Oracle Corporation and/or its Affiliates, 2010, Reprinted from the Internet at: https://docs.oracle.com/cd/E19683-01/816-5042/rsmapi-18/index.html, 3 pages.
Oracle., "Using Scatter/Gather DMA," Windows Drivers/Micorsoft Docs, Windows Hardware Developer, Kernel-Mode Driver Architecture, 2021, Reprinted from the Internet at: https://docs.oracle.com/cd/E19683-01/816-5042/rsmapi-18/index.html, 4 pages.
Parisi J., et al., "NFS in NetApp ONTAP Best Practice and Implementation Guide," National Science Foundation (.gov), 2023, 171 pages.
Teofilo L., "NetApp Storage QoS Tutorial", Flackbox, Retrieved on Feb. 6, 2023, 27 pages. Retrieved from Internet URL: https://www.flackbox.com/netapp-storage-qos-tutorial.
Zhaofeng Z., "How to Design a Storage Layer for Structured Data Storage Requirements," Alibaba Cloud Storage, 2020, Reprinted from the Internet at: https://www.alibabacloud.com/blog/how-to-design-a-storage-layer-for-structured-data-storage-requirements_595904, 18 pages.
Non-Final Office Action mailed on Feb. 12, 2025 for U.S. Appl. No. 18/629,333, filed Apr. 8, 2024, 18 pages.
Notice of Allowance mailed on Apr. 11, 2024 for U.S. Appl. No. 17/716,978, filed Apr. 8, 2022, 07 pages.
Corrected Notice of Allowance mailed on Aug. 6, 2025 for U.S. Appl. No. 18/629,333, filed Apr. 8, 2024, 02 pages.
Notice of Allowance mailed on Jul. 23, 2025 for U.S. Appl. No. 18/629,333, filed Apr. 8, 2024, 05 pages.

* cited by examiner

100

CLIENT 102

STORAGE STACK 104

FILE SYSTEM LAYER 106

INTERMEDIARY LAYER 108

STORAGE LAYER 110

STORAGE DEVICE 112

UNDERLYING STORAGE DEVICE LAYER 114

PHYSICAL STORAGE BLOCKS 116

100

CLIENT 102

REQUEST BLOCKS (0), (1), (2)
REQUEST CHECKSUMS 118

STORAGE STACK 104

FILE SYSTEM LAYER 106

1ST RESPONSE I/O OPERATION 130

INTERMEDIARY LAYER 108

1ST RESPONSE I/O OPERATION 130

STORAGE LAYER 110

1ST RESPONSE I/O OPERATION 130

STORAGE DEVICE 112

UNDERLYING STORAGE DEVICE LAYER 114

PHYSICAL STORAGE BLOCKS 116

112

STORAGE DEVICE

116

PHYSICAL STORAGE BLOCKS

202

FIRST ZONE

BLOCK (0)

BLOCK (1)

BLOCK (2)

BLOCK (7)

CHECKSUM BLOCK

BLOCK (61)

BLOCK (62)

BLOCK (63)

204

SECOND ZONE

BLOCK (64)

BLOCK (65)

BLOCK (66)

CHECKSUM BLOCK

BLOCK (125)

BLOCK (126)

BLOCK (127)

500

CLIENT 102

REQUEST BLOCK (63)
REQUEST CHECKSUM 502

STORAGE STACK 104

FILE SYSTEM LAYER 106

SINGLE INTERMEDIARY I/O
OPERATION FOR BLOCK (63)
AND CHECKSUM BLOCK 504

INTERMEDIARY LAYER 108

SINGLE INTERMEDIARY I/O
OPERATION FOR BLOCK (63)
AND CHECKSUM BLOCK 504

STORAGE LAYER 110

SINGLE REQUEST
MESSAGE FOR BLOCK (63)
AND CHECKSUM BLOCK 506

STORAGE DEVICE 112

UNDERLYING STORAGE DEVICE LAYER 114

PHYSICAL STORAGE BLOCKS 116

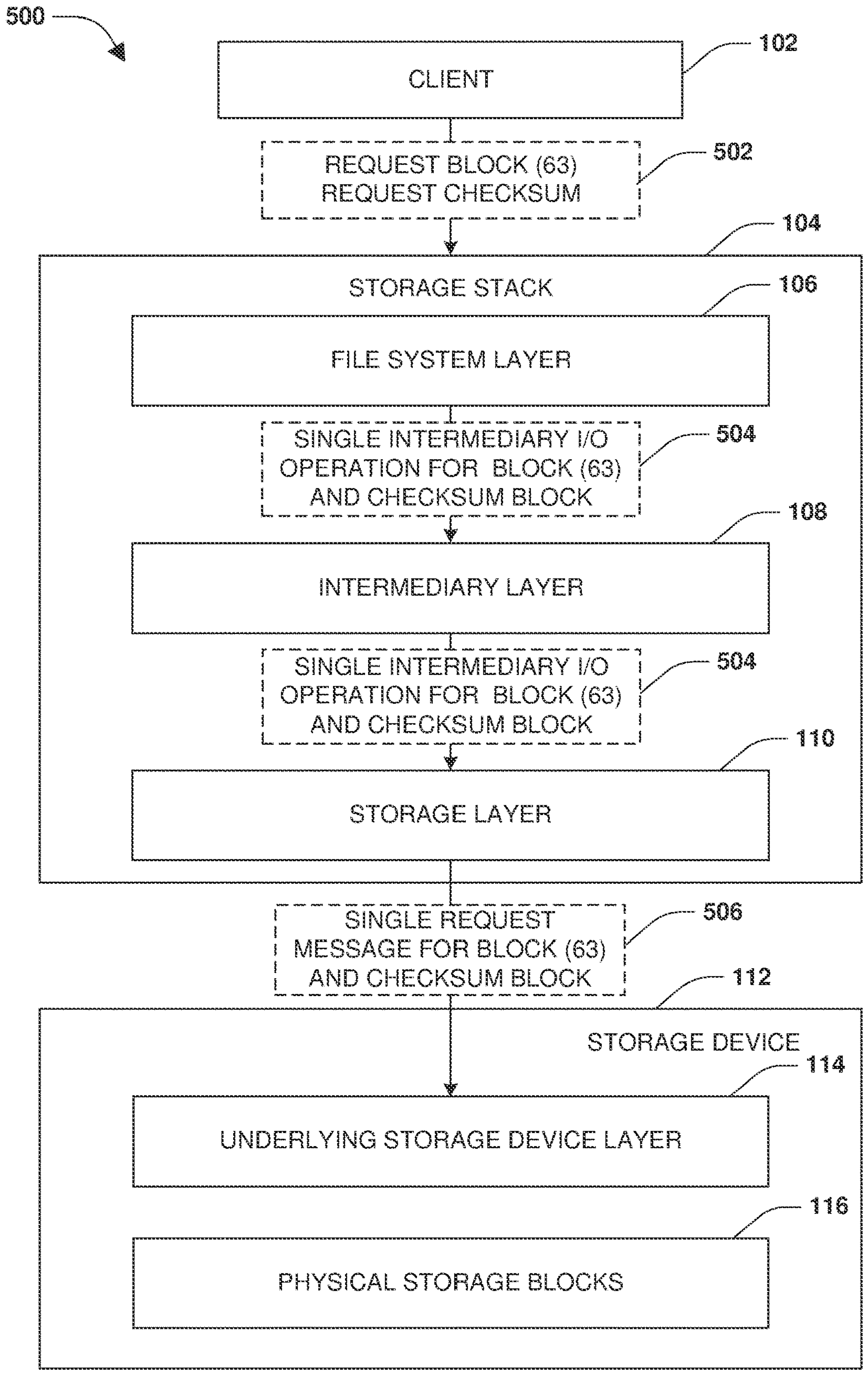

CLIENT 102

REQUESTS FOR BLOCKS AND CHECKSUMS 702

STORAGE STACK 104

FILE SYSTEM LAYER 106

COMBINED INTERMEDIARY I/O OPERATIONS 704

INTERMEDIARY LAYER 108

COMBINED INTERMEDIARY I/O OPERATIONS 704

708 RECEIVE RATE / TRANSMIT RATE

STORAGE LAYER 110

706 DELAY

SINGLE COMBINED I/O OPERATION 710

STORAGE DEVICE 112

UNDERLYING STORAGE DEVICE LAYER 114

PHYSICAL STORAGE BLOCKS 116

ACCUMULATING I/O OPERATIONS OF DATA AND CHECKSUMS INTO A SINGLE COMBINED I/O OPERATION FOR IMPLEMENTATION BY AN UNDERLYING STORAGE DEVICE LAYER

RELATED APPLICATIONS

This application claims priority to and is a continuation of U.S. Patent Application, titled "ACCUMULATING I/O OPERATIONS INTO A SINGLE COMBINED I/O OPERATION FOR IMPLEMENTATION BY AN UNDERLYING STORAGE DEVICE LAYER", filed on Apr. 8, 2022 and accorded application Ser. No. 17/716,978, which is incorporated herein by reference.

TECHNICAL FIELD

Various embodiments of the present technology relate to a storage stack. More specifically, some embodiments relate to a storage stack accumulating I/O operations for implementation by an underlying storage device layer of a storage device.

BACKGROUND

Many file systems store data according to fixed size blocks on storage devices. For example, a file system may store data within 4 kb fixed sized blocks within a storage device. The data stored within the storage device can become corrupt for various reasons such as due to software corruption, hardware failures, power outages, etc. If data of a file becomes corrupt, then the file may become unusable. In order to validate the integrity of a data block, a checksum of the data within the data block may be used. In particular, when the data is stored within the data block, the checksum of the data may be calculated and stored elsewhere within the storage device. The checksum may be calculated using a checksum function, such as a hash function, a fingerprint function, a randomized function, a cryptographic hash function, or other functions that output checksums for data input into the functions. The checksum may be a sequence of numbers and/or letters that can be used to check the data for errors. When accessing the data in the data block, the checksum may be retrieved and used to validate the integrity of the data. In particular, the checksum function may be executed upon the data being read from the data block to generate a current checksum for the data currently stored in the data block. If the current checksum matches the checksum that was previously calculated for the data when the data was stored within the data block, then the data has not changed and is validated. If the checksums do not match, then the data has changed and may be corrupt/invalid.

DESCRIPTION OF THE DRAWINGS

Embodiments of the present technology will be described and explained through the use of the accompanying drawings in which:

FIG. 5A is a block diagram illustrating an example of combining data block I/O and checksum block I/O into a single I/O operation in accordance with an embodiment of the present technology.

Figure 1A:
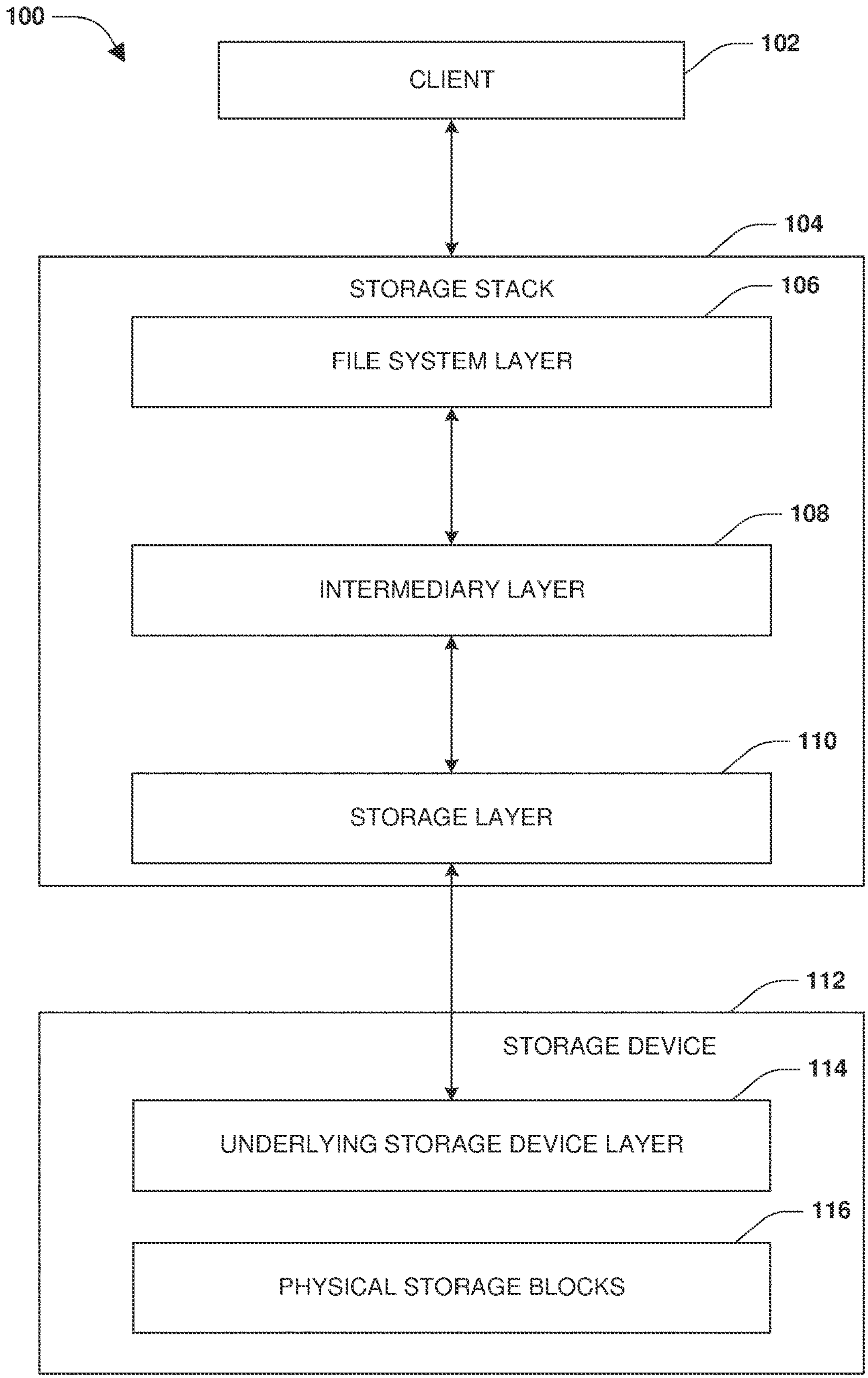
FIG. 1A is a block diagram illustrating an example of a storage stack communicatively coupled with an underlying storage device layer of a storage device in accordance with an embodiment of the present technology.

The drawings have not necessarily been drawn to scale. Similarly, some components and/or operations may be separated into different blocks or combined into a single block for the purposes of discussion of some embodiments of the present technology. Moreover, while the present technology is amenable to various modifications and alternative forms, specific embodiments have been shown by way of example in the drawings and are described in detail below. The intention, however, is not to limit the present technology to the particular embodiments described. On the contrary, the present technology is intended to cover all modifications, equivalents, and alternatives falling within the scope of the present technology as defined by the appended claims.

DETAILED DESCRIPTION

The techniques described herein are directed to improving the efficiency of processing I/O operations through a storage stack and reducing the latency resulting from the round trip time between communicating I/O operations between the storage stack and an underlying storage device layer of a storage device. A storage system may implement a storage stack with various layers configured to process I/O operations targeting a storage device used by the storage system to store data within data blocks of the storage device. Each layer of the storage stack may perform certain processing upon an I/O operation before the I/O operation is executed upon the storage device. When a client submits an I/O operation through a file system that stores and organizes data within the storage device, the I/O operation may be initially received by a file system layer of the storage stack. The file system layer may expose files, directories, and/or other information to the client through the file system. The file system may implement various storage operations using the file system layer, such as compression, encryption, tiering, deduplication, snapshot creation etc.

After processing the I/O operation, the file system layer may then route the I/O operation through one or more intermediary layers of the storage stack. One of the intermediary layers may be a block storage layer. In some embodiments, the block storage layer may be implemented as a redundant array of independent disks (RAID) layer. Because the storage device may be physical raw block storage, the storage system may implement the block storage layer to provide a higher-level block storage abstraction over the physical raw block storage. The block storage layer may implement RAID functionality to combine several physical storage devices into what appears to the client as a single storage device with improved resilience and performance because data can be distributed and/or redundantly stored across the multiple physical storage devices. The block storage layer may implement various operations, such as tiering, compression, replication, and encryption.

Once the I/O operation has been processed by the one or more intermediary layers, the I/O operation may be routed to a storage layer of the storage stack. The storage layer may be configured to transmit the I/O operation to an underlying storage device stack of the storage device for executing the I/O operation. The storage layer may receive a response back from the underlying storage device stack. The response may comprise data that was requested by the I/O operation (a read operation) or an indication that data of the I/O operation (a write operation) was successfully written to the storage device. The response may be processed through the storage stack back to the client. In this way, the storage stack is used by the storage system to process I/O operations directed to the storage device.

The data stored within the storage device may experience data corruption for various reasons, such as due to software corruption, hardware failures, power outages, etc. In order to validate the integrity of the data stored within the storage device and detect errors, a checksum function may be implemented by the storage system. When data is stored within a data block, a checksum of the data may be calculated by the checksum function. The checksum may be calculated using a checksum function, such as a hash function, a fingerprint function, a randomized function, a cryptographic hash function, or other functions that output the checksum for data input into the functions. The checksum may be a sequence of numbers and/or letters that can be used to check the data for errors. When accessing the data in the data block, the checksum function may be executed to calculate a current checksum of the data currently being accessed within the data block. If the current checksum matches the checksum that was previously calculated for the data, then the data has not changed and is validated. If the checksums do not match, then the data may be determined to be corrupt. The data or data block may either be flagged as corrupt and invalid, or the data may be recovered utilized various types of data recovery techniques.

Implementation of checksums for data integrity can result in increased latency and other inefficiencies of the storage stack and communication between the storage stack and the underlying storage device layer of the storage device. In particular, when a client submits a request to access a set of data blocks (e.g., a read operation to read block (0), block (1), and block (2)), the request results in two separate and independently processed I/O operations. The request results in an I/O operation to access the set of data blocks and an additional I/O operation to read checksums for the set of blocks. Both of these I/O operations are separately and independently processed by the storage stack. The I/O operations are also separately and independently executed upon the storage device to access the set of blocks and the checksums. Each layer of the storage stack may receive I/O operations, queue the I/O operations for subsequent processing, dequeue and process the I/O operations, and transmit the I/O operations to a next layer within the storage stack. This processing of I/O operations at each layer introduces latency for the I/O operations. This latency is increased when each I/O operation for a set of data blocks also results in a separate I/O operation for checksums of the set of data blocks. These two I/O operations are separately routed and processed through the storage stack, thus increasing the overall latency of I/O operations being processed by the storage stack.

Latency of processing I/O operations is further affected by the round trip time of the storage layer of the storage stack transmitting an I/O operation to the underlying storage device layer of the storage device for execution and receiving a response back from the underlying storage device layer. Individually transmitting each I/O operation from the storage layer of the storage stack to the underlying storage device layer of the storage device is inefficient and increases the latency of processing I/O operations due to the high round trip time of the I/O operations and responses to the I/O operations since the underlying storage device layer may be a software stack as opposed to faster and more efficient dedicated hardware.

Accordingly, as provided herein, techniques are provided for improving the efficiency of processing I/O operations through a storage stack and reducing latency resulting from the round trip time between communicating I/O operations and responses between the storage stack and an underlying storage device layer of a storage device. The file system layer of the storage stack is configured with non-routine and unconventional I/O operation processing functionality to improve the efficiency of routing and processing I/O operations through the storage stack. In particular, the file system layer may receive an I/O operation targeting a set of blocks stored within the storage device. The I/O operation may be associated with a corresponding I/O operation to read a checksum block comprising checksums for the set of blocks.

Instead of routing and processing the I/O operation and the corresponding I/O operation separately through the storage stack, the I/O operation processing functionality of the file system layer is configured to combine these two I/O operations into a single I/O operation. In order to combine the two I/O operations into a single I/O operation, the I/O operation processing functionality identifies a contiguous range of blocks that includes the set of blocks and the checksum block. This contiguous range of blocks may include one or more intermediary blocks between the set of blocks and the checksum block. In some embodiments, the I/O operation targets block (3), block (4), and block (5), and the corresponding I/O operation targets block (32) where the checksum block is located. Accordingly, the contiguous range of blocks may correspond to block (3) through block (32). The storage layer may generate the single I/O operation targeting the contiguous range of blocks and including an indication that merely the block (3), the block (4), the block (5), and the checksum block, but not other blocks of the contiguous range of blocks, are to be actually read from the storage device. The single I/O operation targeting the contiguous range of blocks from block (3) through block (32) is routed and processed through the storage stack instead of routing both the I/O operation and the corresponding I/O operation. Processing a single I/O operation through the stack instead of two separate individual I/O operations reduces the latency processing the I/O operation for the client.

The latency of processing the I/O operation is further reduced by implementing non-routine and unconventional I/O operation processing functionality at the storage layer of the storage stack. When the storage layer is receiving I/O operations faster than the storage layer is able to transmit the I/O operations to the underlying storage device layer for execution upon the storage device, the storage layer may accumulate one or more I/O operations that may be combined together in a single I/O operation. Instead of individually transmitting the I/O operations to the underlying storage device layer for execution upon the storage device and incurring round trip time penalties for each I/O operation, the storage layer transmits the single I/O operation to the underlying storage device layer for execution upon the storage device. In this way, merely the round trip time penalty between transmitting the single I/O operation to the underlying storage device layer and receiving a response back for the single I/O operation is incurred for the I/O operations that were accumulated into the single I/O operation.

Various embodiments of the present technology provide for a wide range of technical effects, advantages, and/or improvements to computing systems and components. For example, various embodiments may include one or more of the following technical effects, advantages, and/or improvements: 1) non-routine and unconventional I/O operation processing functionality that is integrated into a file system layer of a storage stack so that the file system layer can combine an I/O operation targeting a set of data blocks with a corresponding I/O operation targeting a checksum block of checksums for the set of blocks to create a single intermediary I/O operation; 2) routing the single intermediary I/O operation through the storage stack to a storage layer as opposed to routing both the I/O operation and the corresponding I/O operation through the storage stack; 3) reducing the latency of processing the I/O operation for the client because merely the single intermediary I/O operation is routed through and processed by the storage stack instead of incurring additional delay from individually and separately routing and processing both the I/O operation and the corresponding I/O operation through the storage stack; 4) non-routine and unconventional I/O operation processing functionality that is integrated into a storage layer of the storage stack so that the storage layer can accumulate I/O operations that are combined into a single combined I/O operation transmitted to an underlying storage device layer of a storage device; 5) reducing latency from round trip times of the I/O operations between the storage layer and the underlying storage device layer by merely transmitting the single combined I/O operation to the underlying storage device layer; 6) combining multiple I/O operations into single combined I/O operations so that a storage system can process overall more I/O operations (due to multiple I/O operations being combined) while staying within a finite number of I/O operations that the storage stack is capable of processing, which is limited based upon an amount of CPU and memory provided to the storage system and 7) improving I/O operations per second (IOPS) by combining I/O operations.

In the following description, for the purposes of explanation, newer specific details are set forth in order to provide a thorough understanding of embodiments of the present technology. It will be apparent, however, to one skilled in the art that embodiments of the present technology may be practiced without some of the specific details. While, for convenience, embodiments of the present technology are described with reference to container orchestration platforms (e.g., Kubernetes) and distributed storage architectures, embodiments of the present technology are equally applicable to various other types of hardware, software, and/or storage environments.

The phrases "in some embodiments," "according to some embodiments," "in the embodiments shown," "in one embodiment," and the like generally mean the particular feature, structure or characteristic following the phrase is included in at least one implementation of the present technology, and may be included in more than one implementation period in addition such phrases do not necessarily refer to the same embodiment or different embodiments.

FIG. 1A is a block diagram illustrating an example of a storage stack communicatively coupled with an underlying storage device layer of a storage device in accordance with an embodiment of the present technology. A client 102 may access a storage device 112 through a storage stack 104. The storage stack 104 may be implemented by a storage system, such as a node, a storage virtual machine, a container (e.g., a container within a Kubernetes environment), a serverless thread, a computing device, etc. The storage stack 104 may receive I/O operations from the client 102 for processing before the I/O operations are executed upon physical storage blocks 116 of the storage device 112 by an underlying storage device layer 114 of the storage device 112. The I/O operations may be processed by various layers of the storage stack 104. The layers of the storage stack 104 may perform certain processing upon I/O operations before the I/O operations are executed upon the storage device 112. A file system layer 106 of the storage stack 104 may be associated with a file system used to store and organize data for the client 102 within the storage device 112. The file system layer 106 of the storage stack 104 may expose files, directories, and/or other information to the client 102 through the file system. The file system layer 106 of the storage stack 104 may perform various storage functions, such as compression, encryption, tiering, deduplication, snapshot creation etc.

File system layer 106 of the storage stack 104 may route I/O operations through one or more intermediary layers of the storage stack 104, such as intermediary layer 108. It may be appreciated that the storage stack 104 may include any number of intermediary layers, and that the intermediary layer 108 is shown merely for illustrative purposes. In some embodiments, the intermediary layer 108 may be implemented as a block storage layer, a redundant array of independent disks (RAID) layer, or any other type of layer. Because the storage device 112 may be physical raw block storage that stores the physical storage blocks 116, the storage system may implement the block storage layer to provide higher-level block storage abstraction over the physical raw block storage. The intermediary layer 108 may implement RAID functionality to combine several physical storage devices (e.g., storage device 112 and/or other storage devices communicatively coupled to the storage stack 104) into a what appears to the client 102 as a single storage device with improved resilience and performance because data can be distributed and/or redundantly stored across the multiple physical storage devices. The block storage layer may implement various operations, such as tiering, compression, replication, and encryption.

The intermediary layer 108 may route I/O operations to a storage layer 110 of the storage stack 104. The storage layer 110 may be configured to transmit I/O operations to the underlying storage device layer 114 of the storage device 112 for executing the I/O operations, such as to write or read data from the physical storage block 116. The storage layer 110 may receive a response back from the underlying storage device layer 114. The response may comprise data that was requested by an I/O operation (a read operation) or an indication that data of an I/O operation (a write operation) was successfully written to the physical storage blocks 116 of the storage device 112. The response may be processed through the storage stack back to the client 102. In this way, the storage stack 104 is used by the storage system to process I/O operations directed to the storage device 112.

Figure 1B:
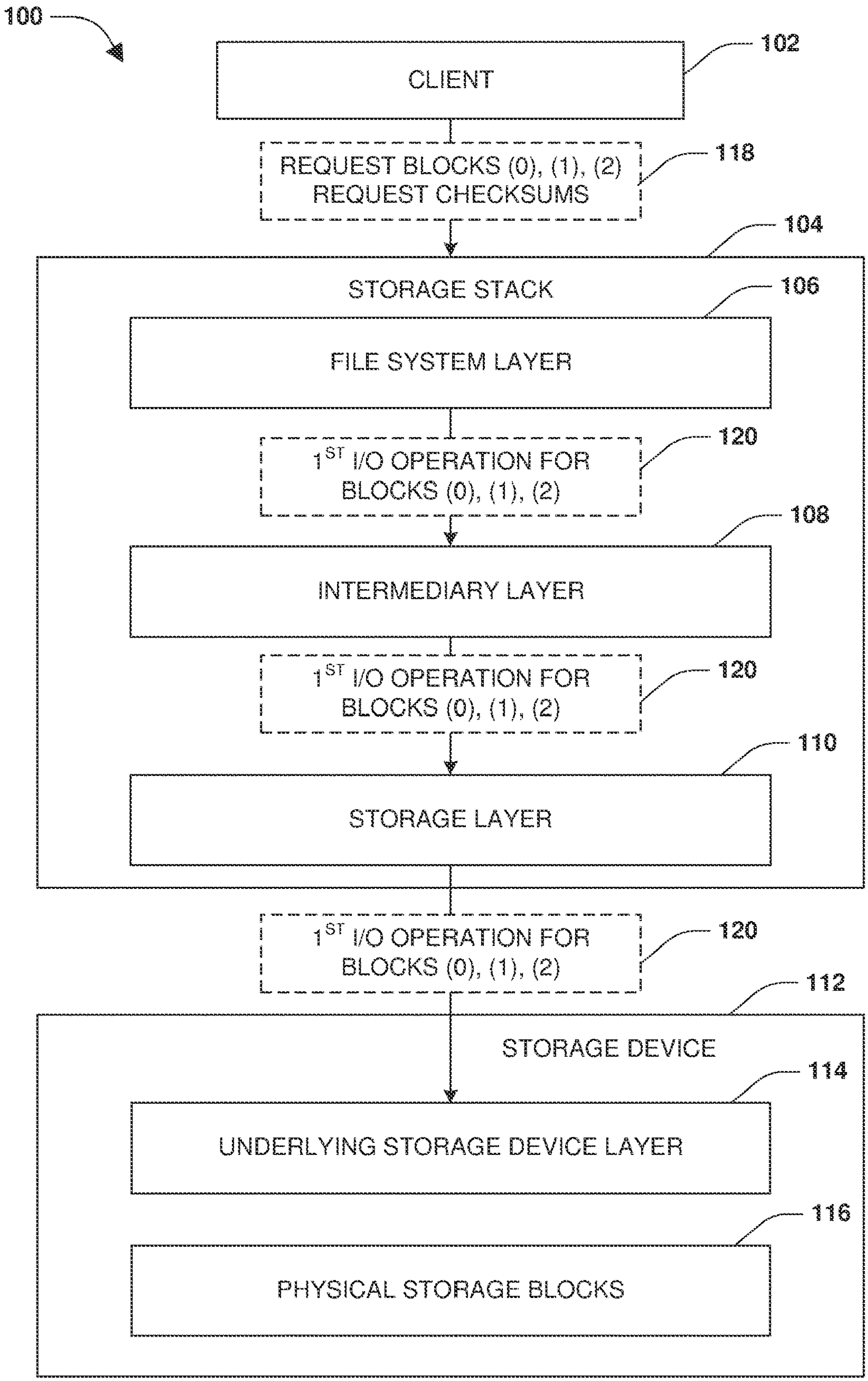
FIG. 1B is a block diagram illustrating an example of a storage stack processing an I/O operation in accordance with an embodiment of the present technology.

FIG. 1B is a block diagram illustrating an example of a storage stack processing an I/O operation in accordance with an embodiment of the present technology. The client 102 may issue a request 118 for access to block (0), block (1), and block (2) of the physical storage blocks 116 within the storage device 112. The request 118 may also correspond to accessing a checksum block comprising checksums for the block (0), the block (1), and the block (2) so that the checksums can be used to verify the integrity of the block (0), the block (1), and the block (2). A conventional implementation of the storage stack 104 without the integration of I/O operation processing functionality into the file system layer 106 will route and process two separate I/O operations through the storage stack 104 in order to process the request 118 from the client 102. This results in increased latency in processing the request 118. In particular, the file system layer 106 may route a first I/O operation 120 targeting the block (0), the block (1), and the block (2) through the intermediary layer 108 and/or any other intermediary layers of the storage stack 104 to the storage layer 110. At each layer, the first I/O operation 120 may be received, queued for subsequent processing, dequeued and processed, and then transmitted to the next layer. Thus, there is significant overhead with each I/O operation processed through the storage stack 104, which can increase latency of processing the request 118 when multiple I/O operations are processed for a single request. Once the storage layer 110 receives the first I/O operation 120, the storage layer 110 transmits the first I/O operation 120 to the underlying storage device layer 114 for executing the first I/O operation 120 upon the storage device 112 to access the block (0), the block (1), and the block (2) of the physical storage blocks 116.

Figure 1C:
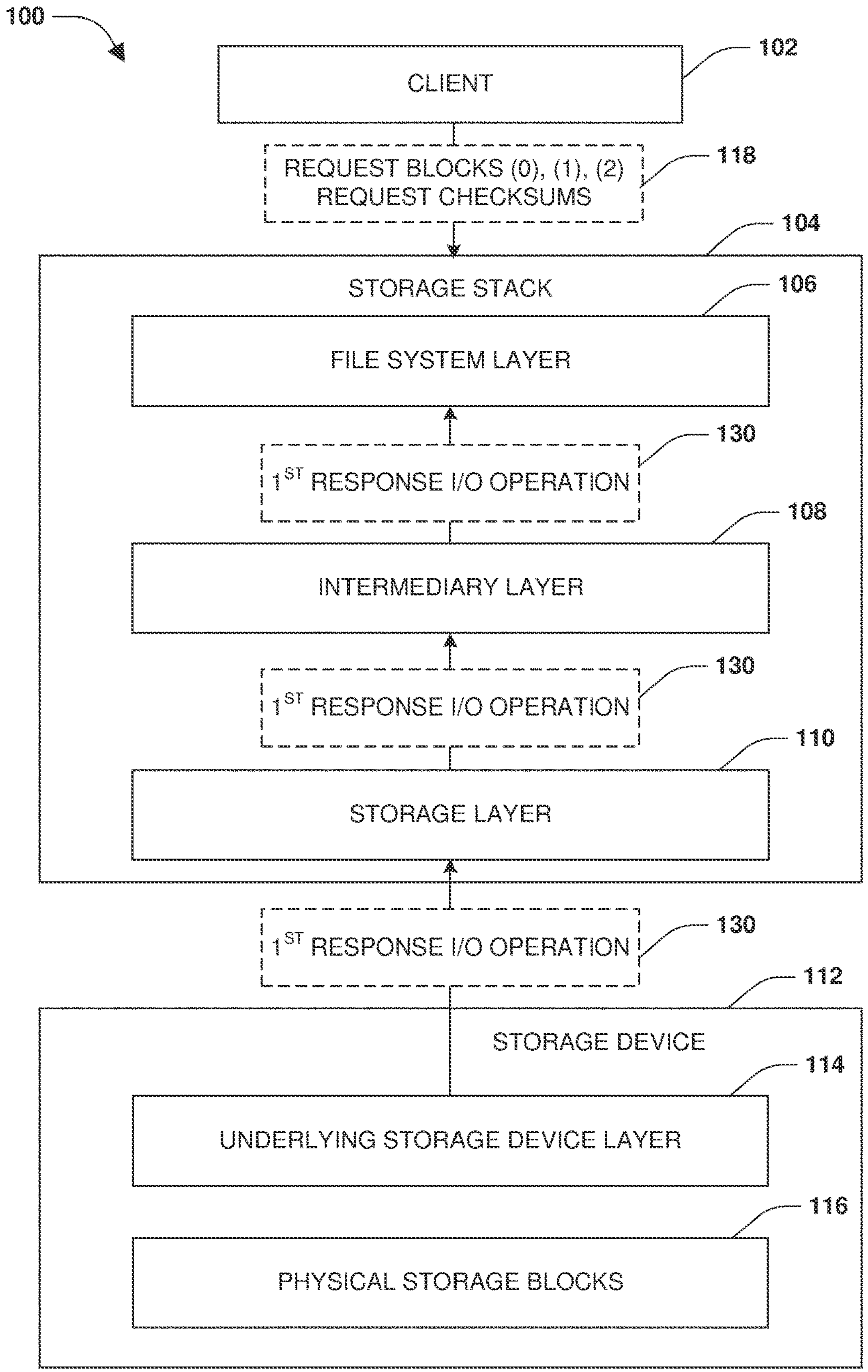
FIG. 1C is a block diagram illustrating an example of a storage stack receiving and processing a response to an I/O operation in accordance with an embodiment of the present technology.

FIG. 1C is a block diagram illustrating an example of a storage stack receiving and processing a response to an I/O operation in accordance with an embodiment of the present technology. The underlying storage device layer 114 may have executed the first I/O operation 120 upon the storage device 112 to access the block (0), the block (1), and the block (2). The underlying storage device layer 114 may generate a first response I/O operation 130 based upon the execution of the first I/O operation 120, such as where the first response I/O operation 130 comprises data read from the execution of the first I/O operation 120 upon the storage device 112 to access the block (0), the block (1), and the block (2). The underlying storage device layer 114 may transmit the first response I/O operation 130 to the storage layer 110 of the storage stack 104. The storage layer 110 may route the first response I/O operation 130 through the intermediary layer 108 to the file system layer 106. However, processing of the request 118 is not yet complete because the checksums for the block (0), the block (1), and the block (2) must also be separately read from the physical storage blocks 116 of the storage device 112, which is further described in relation to FIGS. 1D and 1E.

Figure 1D:
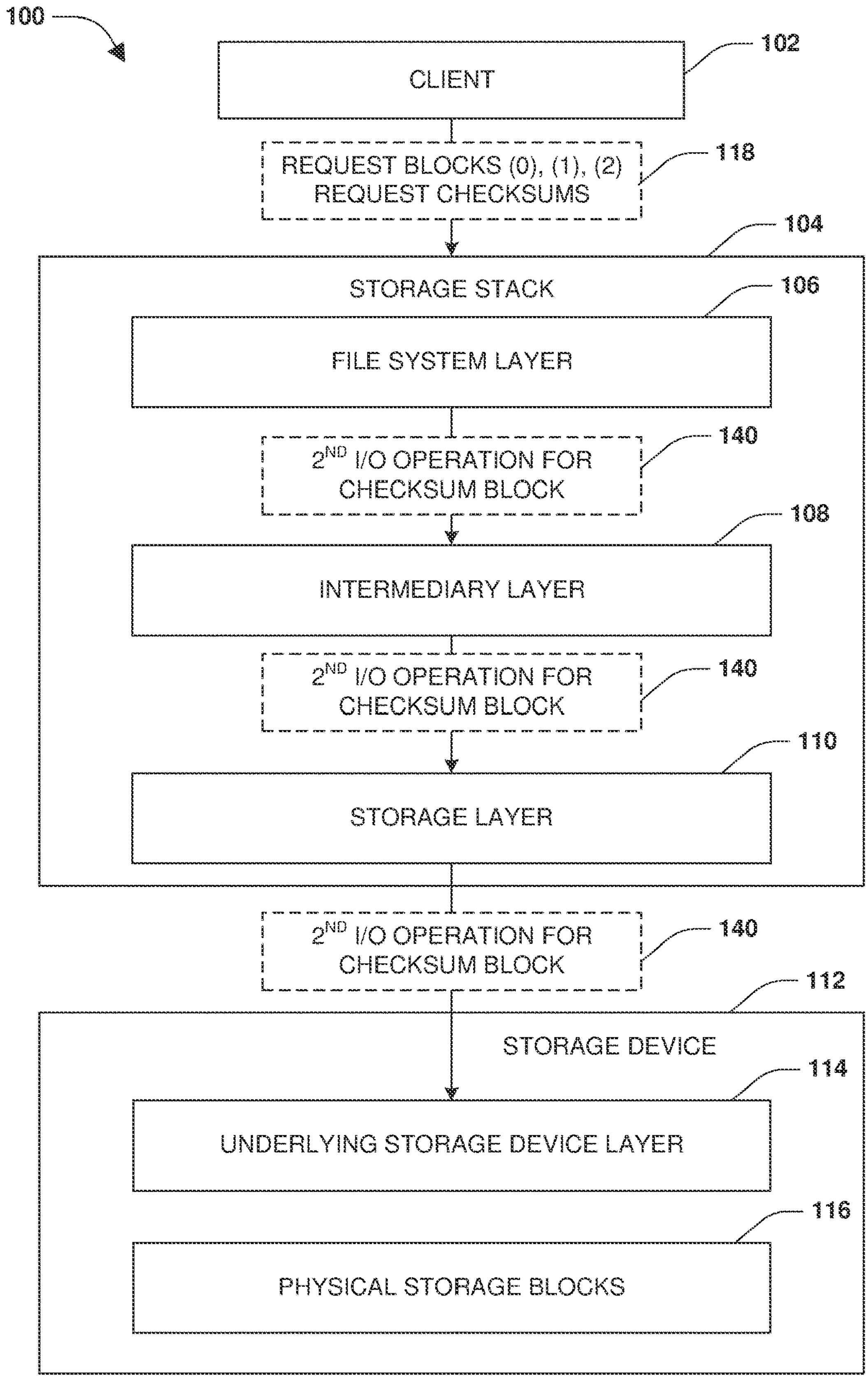
FIG. 1D is a block diagram illustrating an example of a storage stack processing an I/O operation in accordance with an embodiment of the present technology.

FIG. 1D is a block diagram illustrating an example of a storage stack processing an I/O operation in accordance with an embodiment of the present technology. As part of processing the request 118, the file system layer 106 may transmit a second I/O operation 140 to read a checksum block from the physical storage blocks 116 in order to obtain checksums for the block (0), the block (1), and the block (2) stored within the checksum block. In some embodiments, the checksum block may be 4 kb, and a checksum may be 64 bytes. Thus, multiple checksums may be stored within the checksum block. The file system layer 106 may route the second I/O operation 140 targeting the checksum block through the intermediary layer 108 and/or any other intermediary layers of the storage stack 104 to the storage layer 110. At each layer, the second I/O operation 140 may be received, queued for subsequent processing, dequeued and processed, and then transmitted to the next layer. Because both the first I/O operation 120 and the second I/O operation 140 are individually and separately routed and processed through the storage stack 104, latency of the request 118 is significantly increased. Once the storage layer 110 receives the second I/O operation 140, the storage layer 110 transmits the second I/O operation 140 to the underlying storage device layer 114 for executing the second I/O operation 140 upon the storage device 112 to access checksum block of the physical storage blocks 116.

Figure 1E:
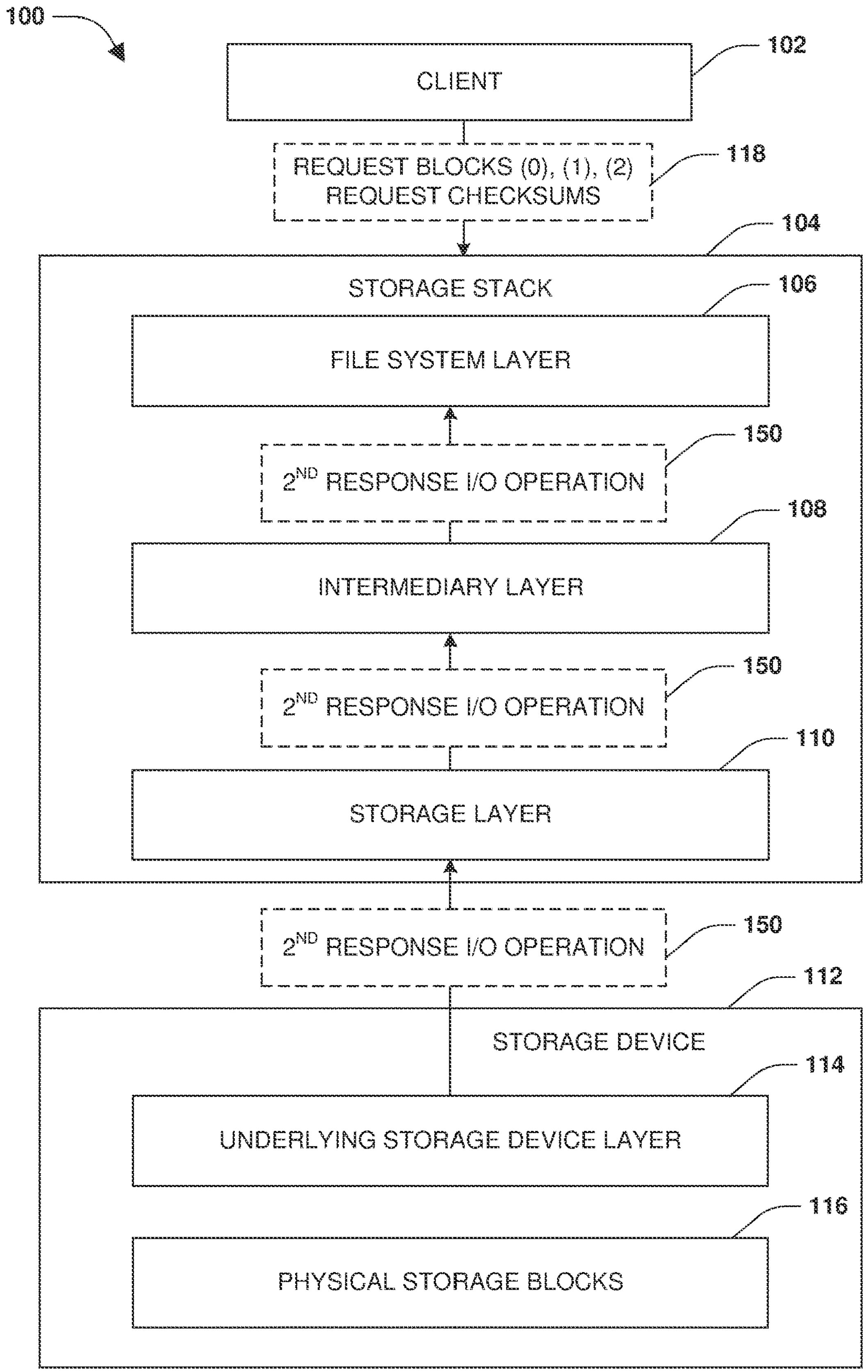
FIG. 1E is a block diagram illustrating an example of a storage stack receiving and processing a response to an I/O operation in accordance with an embodiment of the present technology.

FIG. 1E is a block diagram illustrating an example of a storage stack receiving and processing a response to an I/O operation in accordance with an embodiment of the present technology. The underlying storage device layer 114 may have executed the second I/O operation 140 upon the storage device 112 to access the checksum block. The underlying storage device layer 114 may generate a second response I/O operation 150 based upon the execution of the second I/O operation 140, such as where the second response I/O operation 150 comprises the checksum block with checksums for the block (0), the block (1), and the block (2). The underlying storage device layer 114 may transmit the second response I/O operation 150 to the storage layer 110 of the storage stack 104. The storage layer 110 may route the second response I/O operation 150 through the intermediary layer 108 to the file system layer 106. At this point, the request 118 can be completed based upon the results of the first response I/O operation 130 and the second response I/O operation 150. Latency of processing the request 118 is significant because the first I/O operation 120, the second I/O operation 140, the first response I/O operation 130, and the second response I/O operation 150 were routed and processed through the storage stack 104.

Figure 2:
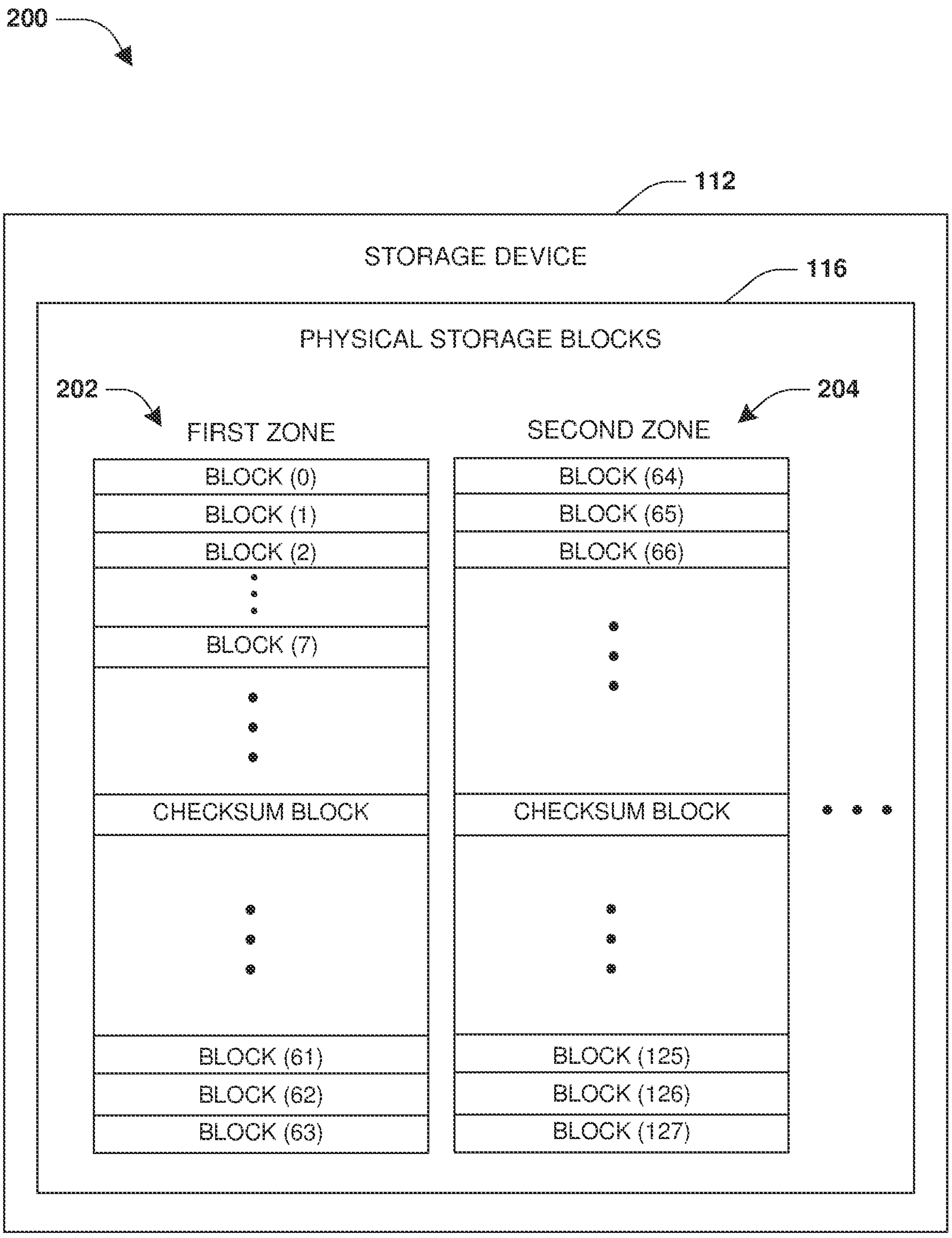
FIG. 2 is a block diagram illustrating an example of a storage device in accordance with an embodiment of the present technology.

FIG. 2 is a block diagram illustrating an example of a storage device in accordance with an embodiment of the present technology. The storage device 112 may store data within the physical storage blocks 116. Zones may be defined to include ranges of blocks of the physical storage blocks 116. In some embodiments, a first zone 202 includes 64 blocks, such as a block (0), a block (1), a block (2), a block (7), a checksum block, a block (61), a block (62), a block (63), and/or other intermediary blocks between the checksum block and the block (2) and between the checksum block and the block (61). A second zone 204 includes 64 blocks, such as a block (64), a block (65), a block (66), a checksum block, a block (125), a block (126), a block (127), and/or other intermediary blocks between the checksum block and the block (66) and between the checksum block and the block (125). It may be appreciated that a zone may include any number of blocks, and that 64 blocks is merely used for illustrative purposes. The zones may be defined and used as part of zone checksum functionality implemented for the physical storage blocks 116.

With the zone checksum functionality, the checksum block within a zone includes checksums for the other blocks within the zone. In some embodiments, the checksum block of the first zone 202 includes checksums for the other 63 blocks within the first zone 202, such as the block (0), the block (1), the block (2), the block (7), the block (61), the block (62), the block (63), and/or intermediary blocks between the checksum block and the block (2) and between the checksum block and the block (61). In some embodiments, the checksum block of the second zone 204 includes checksums for the other 63 blocks within the second zone 204, such as the block (64), the block (65), the block (66), the block (125), the block (126), the block (127) and/or intermediary blocks between the checksum block and the block (66) and between the checksum block and the block (127). In some embodiments, a zone includes 64 blocks or any other number of blocks. A checksum block may be stored within the zone, such as at a middle block (e.g., block (32)) or any other block within the zone. The checksum block includes checksums for blocks occurring before and after the checksum block within the zone. In this way, the zone checksum functionality may be enforced upon the storage device 112 in order to restrict/constrain the storage of blocks and checksums to being in the same zone. A checksum for data of a block within a zone cannot be stored within a checksum block of a different zone. Similarly, the data cannot be stored in a different zone than the zone at which the checksum block with the checksum for the data is stored.

In some embodiments of the present technology, the file system layer 106 may implement I/O operation processing functionality to leverage the concept of zone checksum functionality where checksums of blocks (user data blocks) within a zone are stored within a checksum block within that zone. If a client requests access to block (65), block (66), and checksums for those blocks, then the file system layer executes the I/O operation processing functionality to determine that the block (65) and the block (66) are in the second zone 204, and thus the checksum block within the second zone 204 includes the checksums for the block (65) and the block (66). Instead of separately sending a first I/O operation targeting the block (65) and the block (66) and a second I/O operation targeting the checksum block through the storage stack 104, the file system layer utilizes the I/O operation processing functionality to identify a contiguous range of blocks within the second zone 204 to encompass the block (65), the block (66), and the checksum block. The contiguous range may include blocks from the block (65) to the checksum block in the second zone 204. The contiguous range may include block (65), the block (66), the checksum block, and intermediary blocks within the second zone 204 between the block (66) to the checksum block, such as block (67) through block (95) if the checksum block is block (96). In this way, a single intermediary I/O operation targeting the contiguous range from the block (65) to the checksum block is routed and processed through the storage stack 104. The I/O operation processing functionality may include additional information within the intermediary I/O operation to indicate that merely the block (65), the block (66), and the checksum block are being requested and should actually be read from the physical storage blocks 116 of the storage device 112 and that the intermediary blocks of the contiguous range are not to be read from the physical storage blocks 116 of the storage device 112.

It may be appreciated that the terms an I/O operation, an intermediary I/O operation, a combined I/O operation, a single I/O operation, an accumulated I/O operation, a request, a request message, a response, a response message, and/or other similar terms may be used interchangeably such as to refer to an I/O operation, according to some embodiments.

Figure 3:
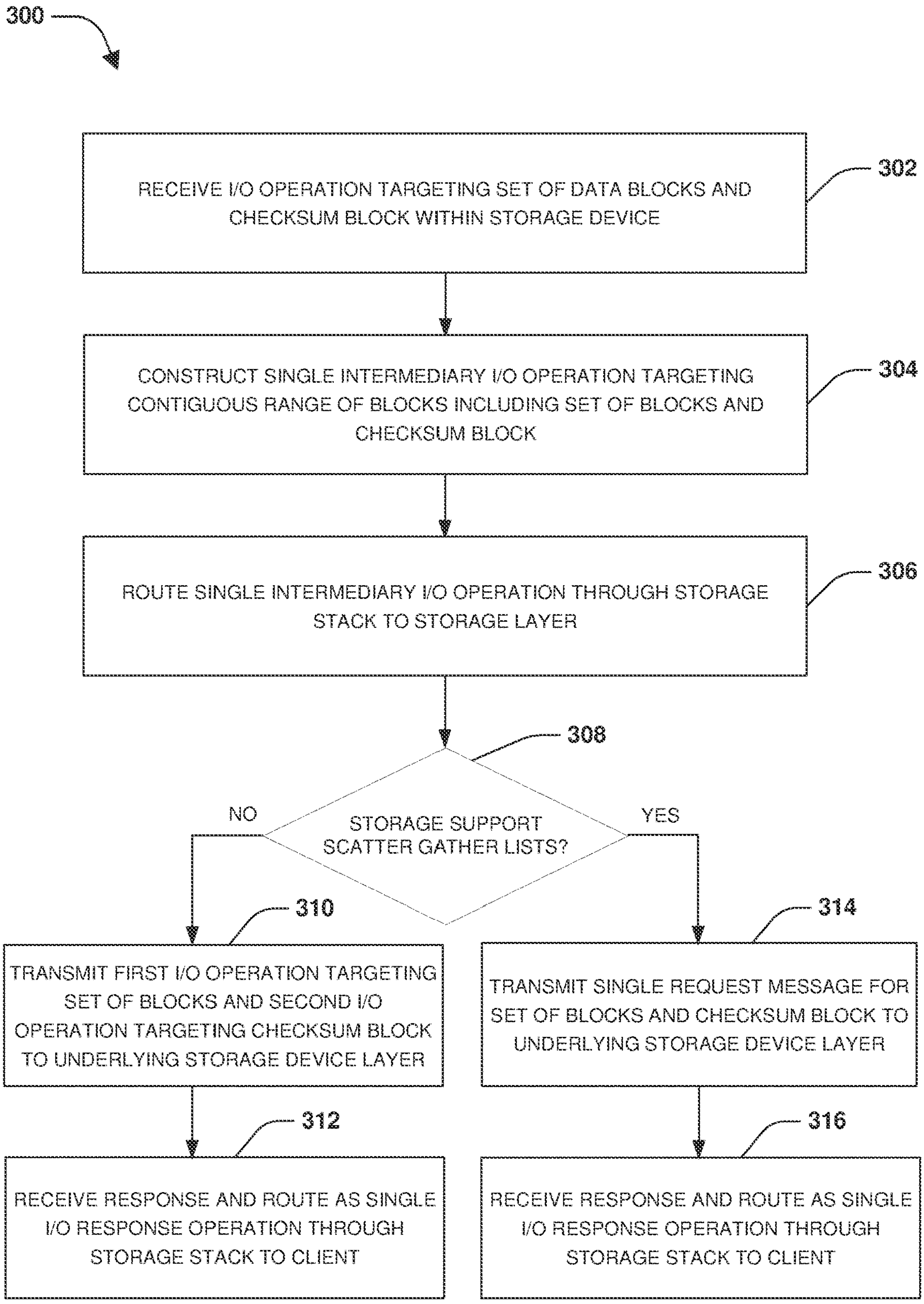
FIG. 3 is a flow chart illustrating an example of combining data block I/O and checksum block I/O into a single I/O operation in accordance with various embodiments of the present technology.

FIG. 3 is a flow chart illustrating an example of combining data block I/O and checksum block I/O into a single I/O operation in accordance with various embodiments of the present technology. During operation 302 of method 300, the file system layer 106 of the storage stack 104 may receive an I/O operation targeting block (7) within the first zone 202. In some embodiments, the block (7) may be a user data block storing user data of the client 102. The file system layer 106 may determine that the block (7) is located within the first zone 202 and/or that the checksum block within the first zone 202 stores a checksum for the block (7). In some embodiments, the file system layer 106 may determine that the block (7) and the checksum block are non-contiguous blocks where there is one or more intermediary blocks between the block (7) and the checksum block (e.g., blocks (8) through (31) if the checksum block is block (32)). Because the block (7) and the checksum block are non-contiguous blocks, the file system layer 106 may identify a contiguous range of blocks that includes the block (7) and the checksum block. In some embodiments, the contiguous range of blocks includes intermediary blocks between the block (7) and the checksum block, such as blocks (8) through (31) if the checksum block is block (32). In some embodiments, the block (7) is a starting offset of the contiguous range of blocks and the checksum block is an ending offset of the contiguous range of blocks. Because the intermediary blocks do not need to be read from the storage device 112 and merely the block (7) and the checksum block need to be read from the storage device 112, the file system layer 106 generate an indication that the block (7) and the checksum block, but not other blocks of the contiguous range of blocks, are to be read from the storage device 112.

During operation 304 of method 300, the file system layer 106 constructs a single intermediary I/O operation targeting the contiguous range of blocks. The file system layer 106 constructs the single intermediary I/O operation to include the indication that the block (7) and the checksum block, but not the other blocks of the contiguous range of blocks, are to be read from the storage device 112. During operation 306 of method 300, the file system layer 106 routes the single intermediary I/O operation through the intermediary layer 108 (and/or other intermediary layers of the storage stack 104) of the storage stack 104 to the storage layer 110. Each layer within the storage stack 104 may receive, queue, dequeue, and/or process the single intermediary I/O operation.

Once the storage layer 110 receives the single intermediary I/O operation, the storage layer 110 may determine whether the storage device 112 supports a scatter gather list, during operation 308 of method 300. If the storage device 112 does not support the scatter gather list, then the storage layer 110 generates and transmits a first I/O operation targeting the block (7) and a second I/O operation targeting the checksum block to the underlying storage device layer 114 for execution upon the storage device 112 based upon the single intermediary I/O operation, during operation 310 of method 300. The storage layer 110 may generate the first I/O operation and the second I/O operation based upon the indication, within the single intermediary I/O operation, that the block (7) and the checksum block, but not the other blocks of the contiguous range of blocks, are to be read from the storage device 112. During operation 312 of method 300, the storage layer 110 may receive read responses for the first I/O operation and the second I/O operation from the underlying storage device layer 114. A first read response I/O operation for the first I/O operation may comprise data of block (7) and the second read response I/O operation for the second I/O operation may comprise the checksum block with the checksum for the block (7). The storage layer 110 may construct a single intermediary response I/O operation comprising the block (7) and the checksum block based upon the first and second read response I/O operations. In this way, the single intermediary response I/O operation is routed through the storage stack 104 back to the client 102.

If the storage device 112 supports the scatter gather list, then the storage layer 110 generates and transmits a single request message (I/O operation) to the underlying storage device layer 114 for execution upon the storage device 112 to read the block (7) and the checksum block but not the other blocks of the contiguous range of blocks, during operation 314 of method 300. In some embodiments, certain types of storage devices (e.g., physical disk devices) support the ability for I/O operations, submitted to the storage devices, to be dis-contiguous (e.g., target a dis-contiguous set of blocks). Such as an I/O operation has a list of offsets and lengths of each contiguous region at the offsets, such as (OFFSET1, LENGTH1), (OFFSET2, LENGTH2), (OFFSET3, LENGTH3, (OFFSET4, LENGTH4) for 4 different contiguous regions that are not contiguous to one another. This I/O operation can be submitted to the storage device as a single request referred to as a scatter gather list.

During operation 316 of method 300, the storage layer 110 may receive a read response I/O operation from the underlying storage device layer 114. The read response I/O operation may comprise data of block (7) and the checksum block with the checksum for the block (7). The storage layer 110 may construct a single intermediary response I/O operation comprising the block (7) and the checksum block based upon the read response I/O operation. In this way, the single intermediary response I/O operation is routed through the storage stack 104 back to the client 102.

The checksum block may be extracted from the single intermediary response I/O operation. The checksum for the block (7) may be identified within the checksum block, and is used to verify the integrity of the block (7) by comparing the checksum within the checksum block to a checksum calculated from the data of the block (7) in the single intermediary response I/O operation.

Figure 4A:
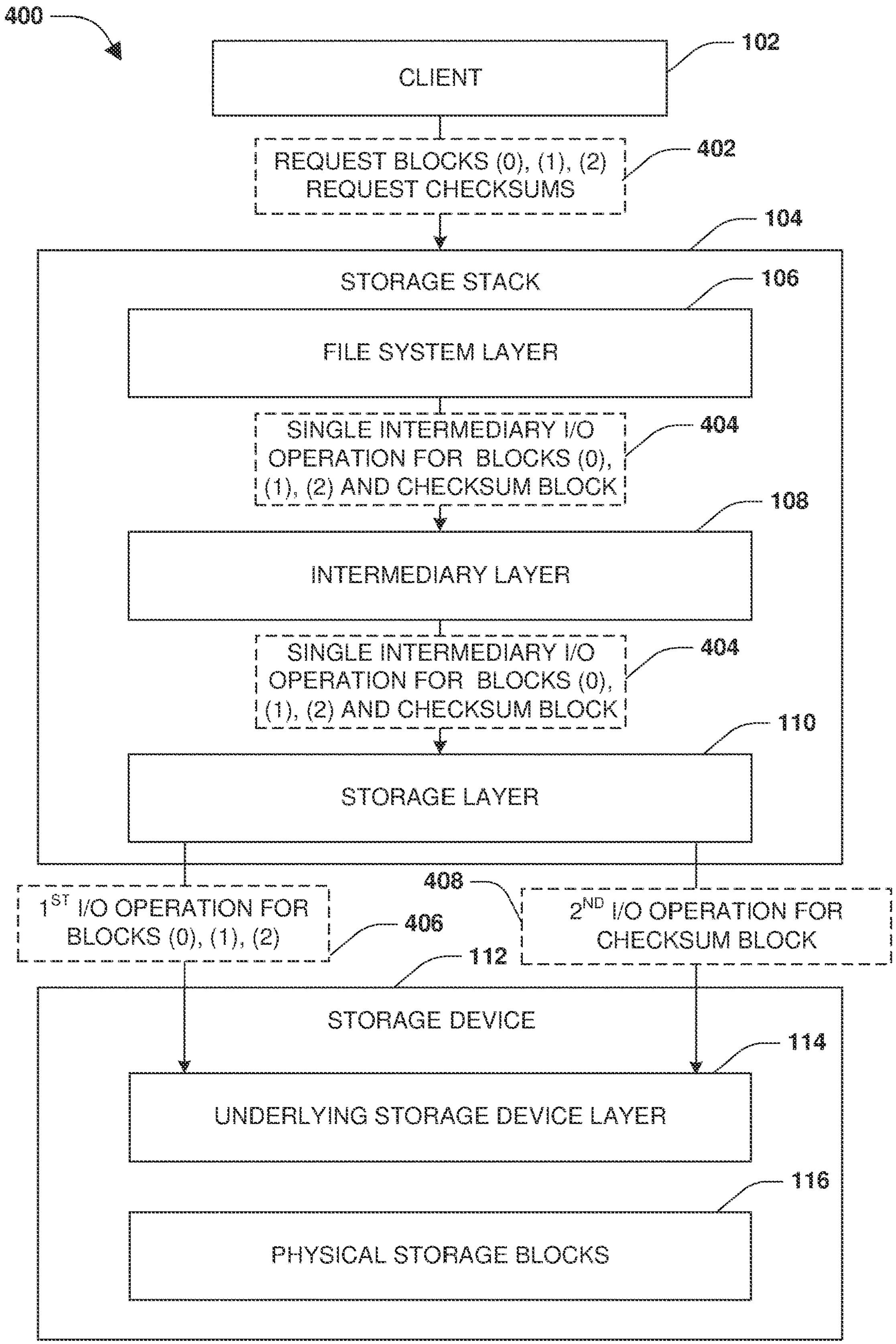
FIG. 4A is a block diagram illustrating an example of combining data block I/O and checksum block I/O into a single I/O operation in accordance with an embodiment of the present technology.

FIG. 4A is a block diagram illustrating an example of combining data block I/O and checksum block I/O into a single I/O operation in accordance with an embodiment of the present technology. In some embodiments, the combining data block I/O and checksum block I/O into the single I/O operation may relate to operation 310 of FIG. 3. The file system layer 106 may receive a request 402 from the client 102 to read block (0), block (1), block (2), and checksums of the block (0), the block (1), and the block (2). The file system layer 106 may construct a single intermediary I/O operation 404 based upon the request 402. The single intermediary I/O operation 404 may target a contiguous range of blocks including the block (0), the block (1), the block (2), the checksum block, and/or any intermediary blocks between the block (2) and the checksum block in the first zone 202. However, the file system layer 106 may include an indication within the single intermediary I/O operation 404 that merely the block (0), the block (1), the block (2), and the checksum block are to be read from the physical storage blocks 116 of the storage device 112. The file system layer 106 may route the single intermediary I/O operation 404 through the intermediary layer 108 (and/or any other intermediary layers of the storage stack 104) to the storage layer 110.

The storage layer 110 may evaluate the indication within the single intermediary I/O operation 404 to determine that merely the block (0), the block (1), the block (2), and the checksum block out of the contiguous range of blocks targeted by the single intermediary I/O operation 404 are to be read from the storage device 112. Accordingly, the storage layer 110 may generate and transmit a first I/O operation 406 targeting the block (0), the block (1), and the block (2) to the underlying storage device layer 114 for execution. The storage layer 110 may generate and transmit a second I/O operation 408 targeting the checksum block to the underlying storage device layer 114 for execution. In some embodiments, the two I/O operations may be transmitted to the underlying storage device layer 114 because the storage device 112 may not support scatter gather lists.

Figure 4B:
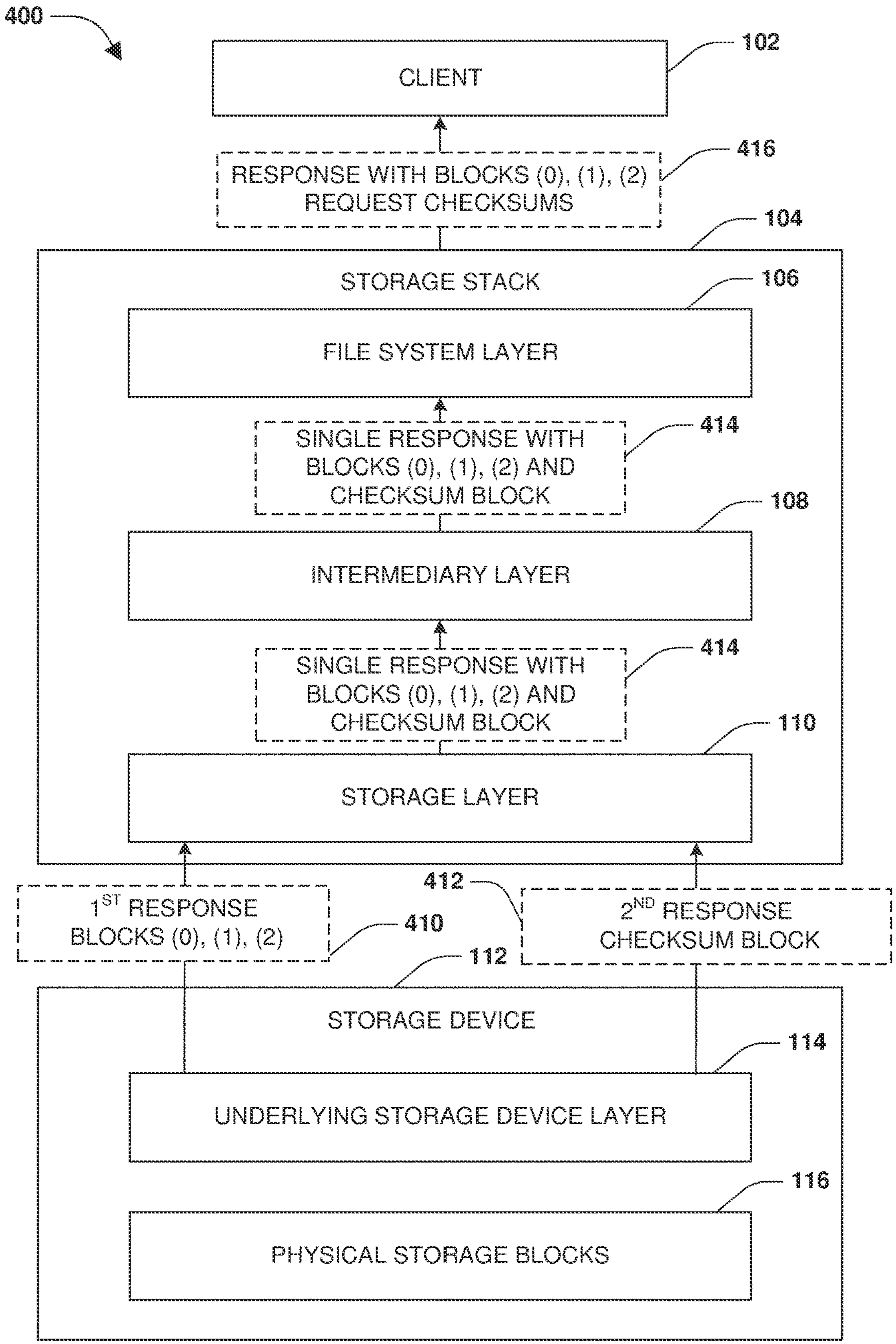
FIG. 4B is a block diagram illustrating an example of a storage stack processing a response from a storage device in accordance with an embodiment of the present technology.

FIG. 4B is a block diagram illustrating an example of a storage stack processing a response from a storage device in accordance with an embodiment of the present technology. The underlying storage device layer 114 may generate and transmit a first response I/O operation 410 to the storage layer 110 based upon executing the first I/O operation 406. The first response I/O operation 410 may include the block (0), the block (1), and the block (2). The underlying storage device layer 114 may generate and transmit a second response I/O operation 412 to the storage layer 110 based upon executing the second I/O operation 408. The second response I/O operation 412 may include the checksum block. The storage layer 110 may be configured to wait for both the first response I/O operation 410 and the second response I/O operation 412 before processing the response I/O operations. Once both response I/O operations are received by the storage layer 110, the storage layer 110 constructs a single intermediary response I/O operation 414 to include the block (0), the block (1), the block (2), and the checksum block. The storage layer 110 routes the single intermediary response I/O operation 414 through the storage stack 104 to the file system layer 106. The file system layer 106 responds 416 to the client 102 based upon the single intermediary response I/O operation 414.

FIG. 5A is a block diagram illustrating an example of combining data block I/O and checksum block I/O into a single I/O operation in accordance with an embodiment of the present technology. The file system layer 106 may receive a request 502 from the client 102 to read block (63) and a checksum of the block (63). The file system layer 106 may construct a single intermediary I/O operation 504 based upon the request 502. The single intermediary I/O operation 504 may target a contiguous range of blocks including the block (63), the checksum block, and/or any intermediary blocks between the block (63) and the checksum block in the first zone 202. However, the file system layer 106 may include an indication within the single intermediary I/O operation 504 that merely the block (63) and the checksum block are to be read from the physical storage blocks 116 of the storage device 112. The file system layer 106 may route the single intermediary I/O operation 504 through the intermediary layer 108 (and/or any other intermediary layers of the storage stack 104) to the storage layer 110.

The storage layer 110 may evaluate the indication within the single intermediary I/O operation 504 to determine that merely the block (63) and the checksum block out of the contiguous range of blocks targeted by the single intermediary I/O operation 504 are to be read from the storage device 112. The storage layer 110 may also determine that the storage device 112 supports scatter gather lists. Accordingly, the storage layer 110 may generate and transmit a single request message 506 (I/O operation) targeting the block (63) and the checksum block to the underlying storage device layer 114 for execution.

Figure 5B:
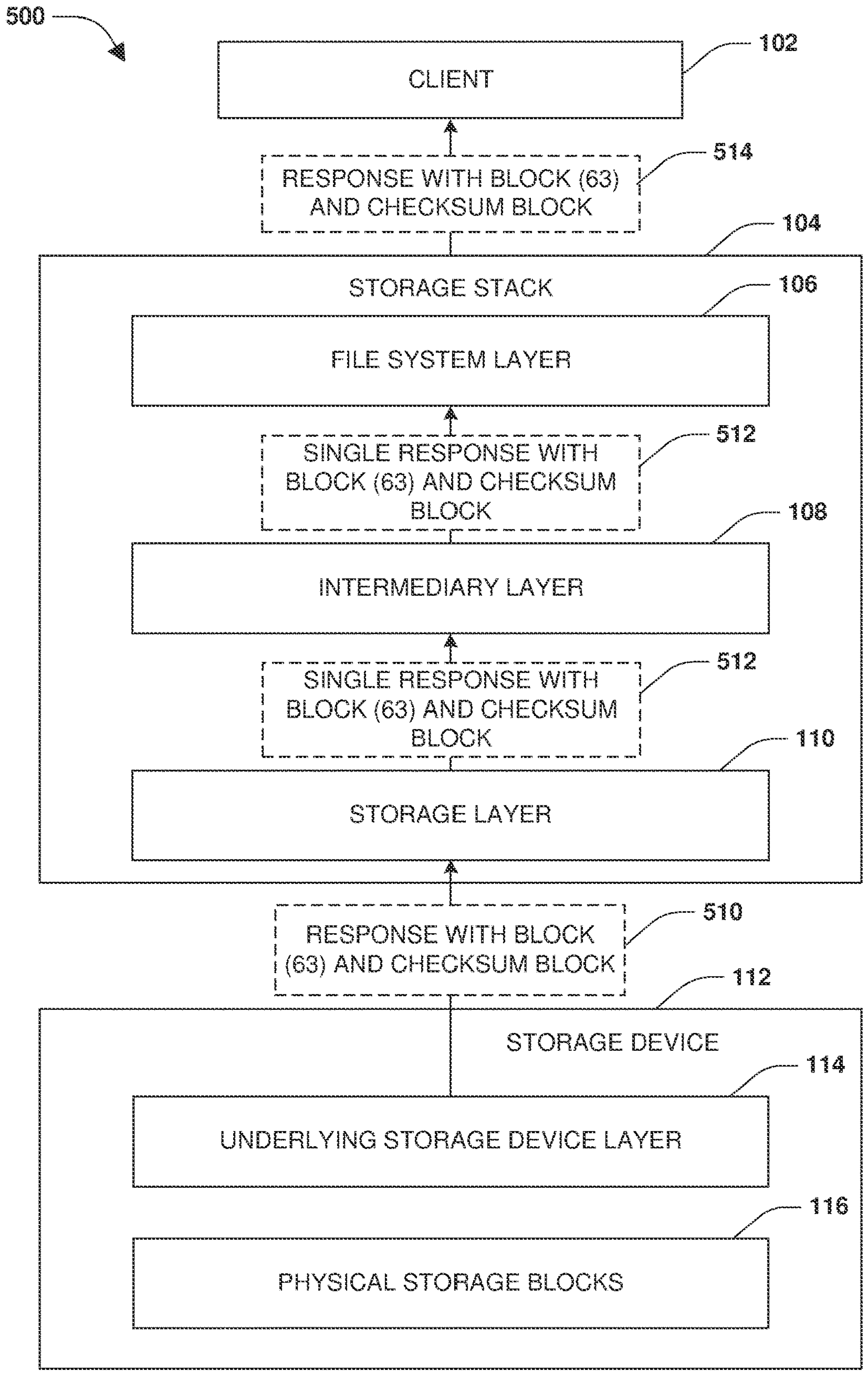
FIG. 5B is a block diagram illustrating an example of a storage stack processing a response from a storage device in accordance with an embodiment of the present technology.

FIG. 5B is a block diagram illustrating an example of a storage stack processing a response from a storage device in accordance with an embodiment of the present technology. The underlying storage device layer 114 may generate and transmit a response I/O operation 510 to the storage layer 110 based upon executing the single request message 506. The response I/O operation 510 may include the block (63) and the checksum block. Once storage layer 110 receives the response I/O operation 510, the storage layer 110 constructs a single intermediary response I/O operation 512 to include the block (63) and the checksum block. The storage layer 110 routes the single intermediary response I/O operation 512 through the storage stack 104 to the file system layer 106. The file system layer 106 responds 514 to the client 102 based upon the single intermediary response I/O operation 512.

Figure 6:
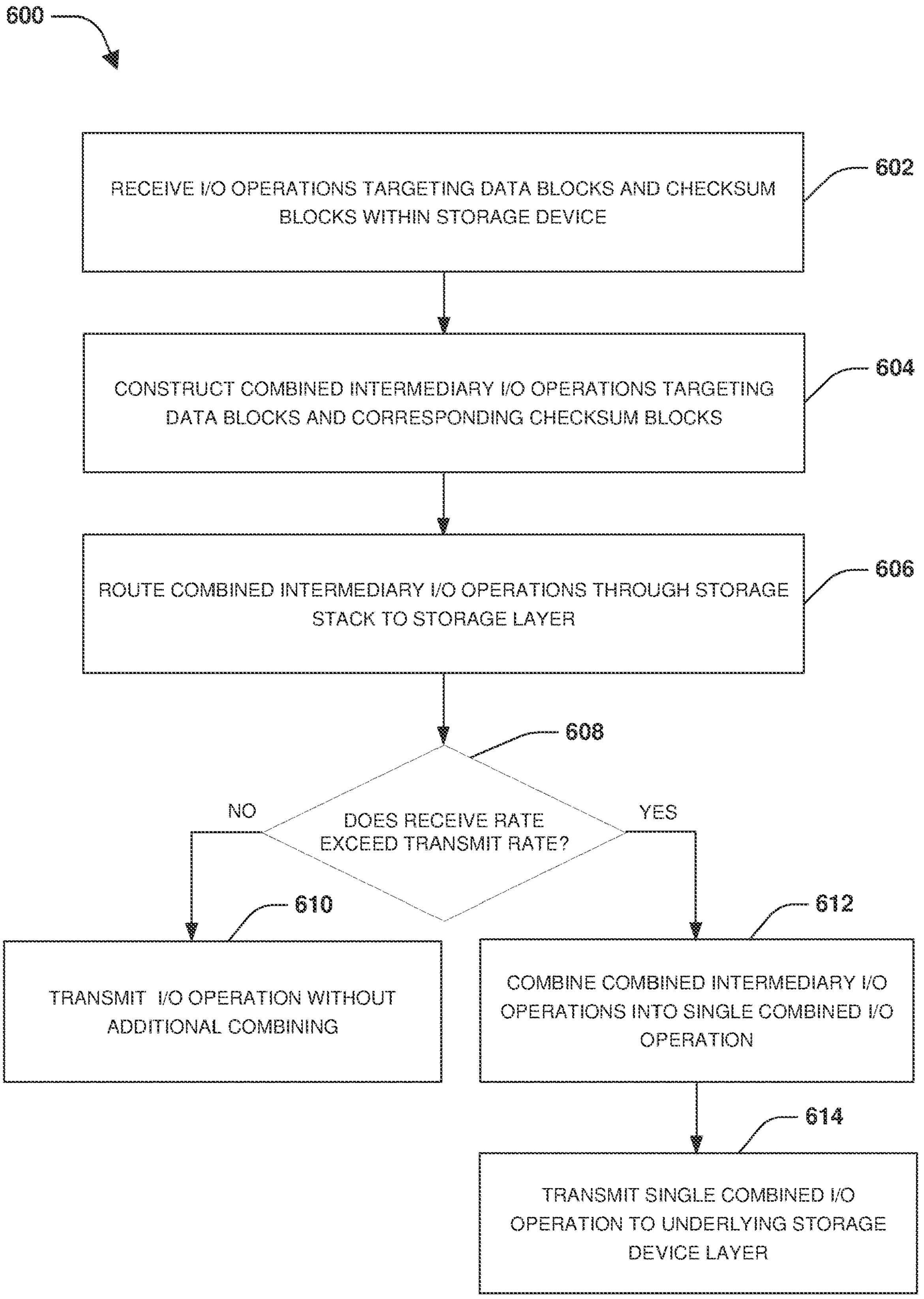
FIG. 6 is a flow chart illustrating an example of transmitting a single combined I/O operation to an underlying storage device layer in accordance with various embodiments of the present technology.

FIG. 6 is a flow chart illustrating an example of transmitting a single combined I/O operation to an underlying storage device layer in accordance with various embodiments of the present technology. During operation 602 of method 600, the file system layer 106 of the storage stack 104 may receive I/O operations from the client 102. In some embodiments, if a first I/O operation targets a set of data blocks and a second I/O operation targets a checksum block with checksums for the set of data blocks, then the file system layer 106 may combine the two I/O operations to construct a single intermediary I/O operation targeting a contiguous range of blocks including the set of data blocks, the checksum block, and/or intermediary blocks between the set of blocks and the checksum block. In this way, the file system layer 106 constructs intermediary I/O operations targeting sets of blocks and corresponding checksum blocks, during operation 604 of method 600.

During operation 606 of method 600, the intermediary I/O operations are routed through the storage stack to the storage layer 110. The storage layer 110 may monitor a rate at which the storage layer 110 is receiving intermediary I/O operations and a rate at which the storage layer 110 is transmitting I/O operations to the underlying storage device layer 114 for execution. During operation 608 of method 600, the storage layer 110 determines whether the rate at which the storage layer 110 is receiving intermediary I/O operations exceeds the rate at which the storage layer 110 is transmitting I/O operations to the underlying storage device layer 114. If the rate at which the storage layer 110 is receiving intermediary I/O operations exceeds the rate at which the storage layer 110 is transmitting I/O operations to the underlying storage device layer 114, then the storage layer 110 may refrain from accumulating the intermediary I/O operations. Instead of accumulating the intermediary I/O operations, the storage layer 110 may transmit I/O operations, derived from the intermediary I/O operations, to the underlying storage device layer 114 for execution as the intermediary I/O operations are received, during operation 610 of method 600.

If the rate at which the storage layer 110 is receiving intermediary I/O operations exceeds the rate at which the storage layer 110 is transmitting I/O operations to the underlying storage device layer 114, then the storage layer 110 may accumulate intermediary I/O operations. The storage layer 110 may implement a delay (a timeframe or duration) during which the storage layer 110 accumulates the intermediary I/O operations. The delay may be set and/or adjusted (increased or decreased) based upon a number of intermediary I/O operations being received during the delay, a round trip time latency between the storage layer sending an I/O operation to the underlying storage device layer 114 and receiving a response back from the underlying storage device layer 114, a rate at which the intermediary I/O operations are received by the storage layer 110, a rate at which the storage layer 110 transmits I/O operations to the underlying storage device layer 114, and/or other factors or combinations thereof. This is to ensure that the delay is not so long that performance is impacted and/or so that the delay is not too short that not enough intermediary I/O operations are accumulated to improve performance. In some embodiments, the underlying storage device layer 114 may be implemented as a software stack. Because the underlying storage device layer 114 is implemented as the software stack as opposed to dedicated performant hardware, the execution of I/O operations through this software stack increases the round trip time latency of transmitting I/O operations to the underlying storage device layer 114 and receiving response from the underlying storage device layer 114.

In some embodiments, the intermediary I/O operations may be accumulated based upon the intermediary I/O operations targeting dis-contiguous ranges of blocks within the storage device 112. In some embodiments, accumulated I/O operations may be read I/O operations, write I/O operations, or combinations thereof. In some embodiments, the accumulated I/O operations may target blocks and/or checksum blocks within the same zone or across different zones, and thus I/O operations targeting any portion of the storage device 112 may be accumulated together.

Once the delay expires, the accumulated I/O operations may be combined into a combined I/O operation targeting blocks and/or checksum blocks that were targeted by the accumulated I/O operations, during operation 612 of method 600. In some embodiments, the accumulated I/O operations may target blocks and/or checksum blocks within the same zone or across different zones, and thus the combined I/O operation may target any storage locations across the storage device 112. During operation 614 of method 600, the storage layer 110 transmits the single combined I/O operation to the underlying storage device layer 114 for execution. When the storage layer 110 receives a response from the underlying storage device layer 114, the storage layer 110 generates and transmits responses for each of the accumulated I/O operations through the storage stack 104 to the client 102. Each response may comprise data of blocks and checksums of the blocks requested by each accumulated I/O operation.

Figure 7A:
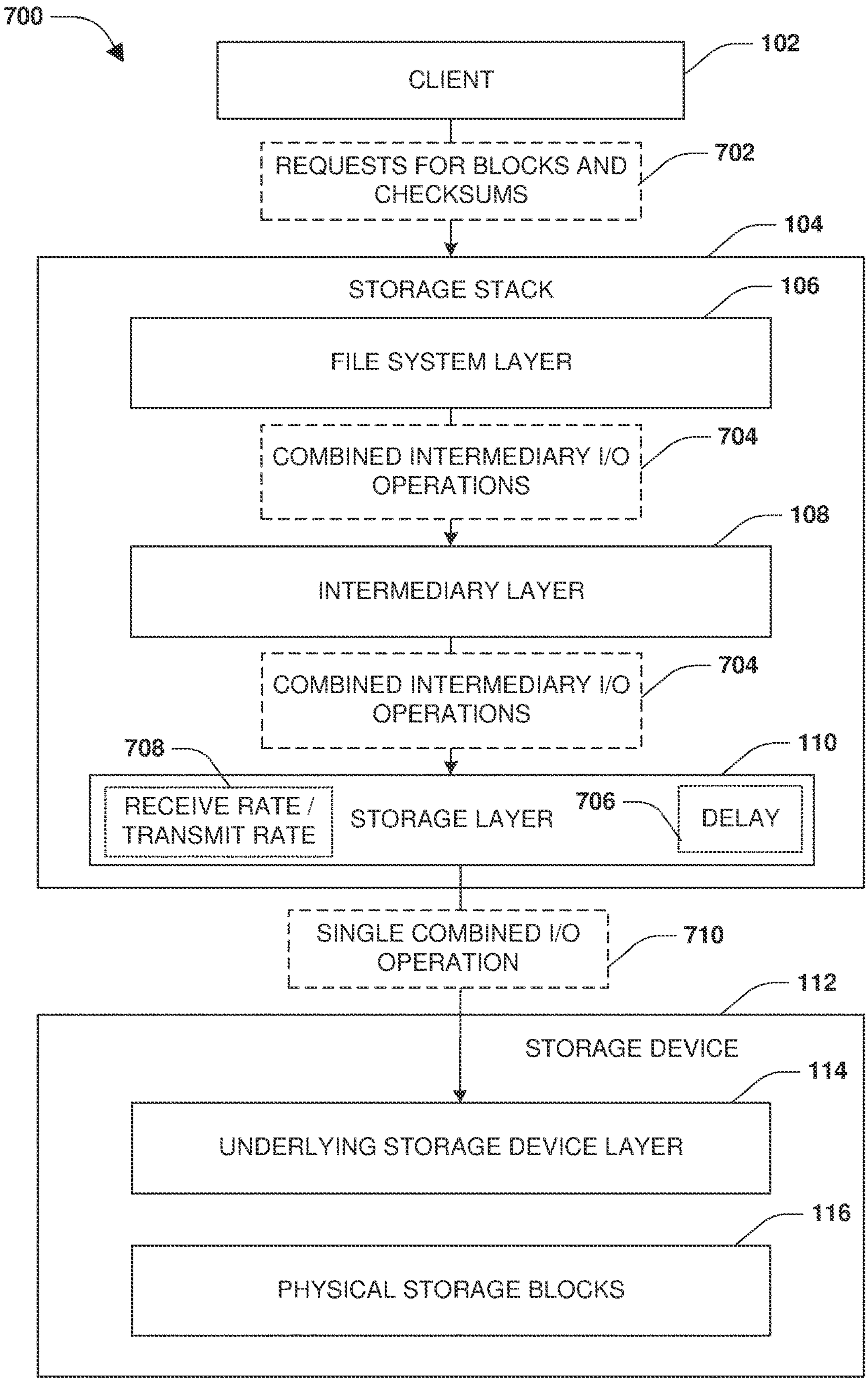
FIG. 7A is a block diagram illustrating an example of transmitting a single combined I/O operation to an underlying storage device layer in accordance with an embodiment of the present technology.

FIG. 7A is a block diagram illustrating an example of transmitting a single combined I/O operation to an underlying storage device layer in accordance with an embodiment of the present technology. The file system layer 106 of the storage stack 104 may receive requests 702 (I/O operations) from the client 102 (and/or other clients). The file system layer 106 may combine a request for a set of data blocks and a request for a checksum block with checksums for the set of data blocks into a combined intermediary I/O operation 704. In this way, the file system layer 106 routes combined intermediary I/O operations 704 through the storage stack 104 to the storage layer 110.

The storage layer 110 may compare 708 a rate of receiving the combined intermediary I/O operations 704 to a rate of transmitting corresponding I/O operations to the underlying storage device layer 114. If the rate of receiving the combined intermediary I/O operations 704 exceeds the rate of transmitting corresponding I/O operations to the underlying storage device layer 114, then the storage layer 110 may accumulate one or more combined intermediary I/O operations 704 over a delay 706 (a timeframe or period). In response to the delay 706 expiring, the accumulated I/O operations may be used to construct a single combined I/O operation 710 targeting the blocks and checksum blocks that the accumulated I/O operations targeted. The storage layer 110 transmits the single combined I/O operation 710 to the storage device 112 for execution.

Figure 7B:
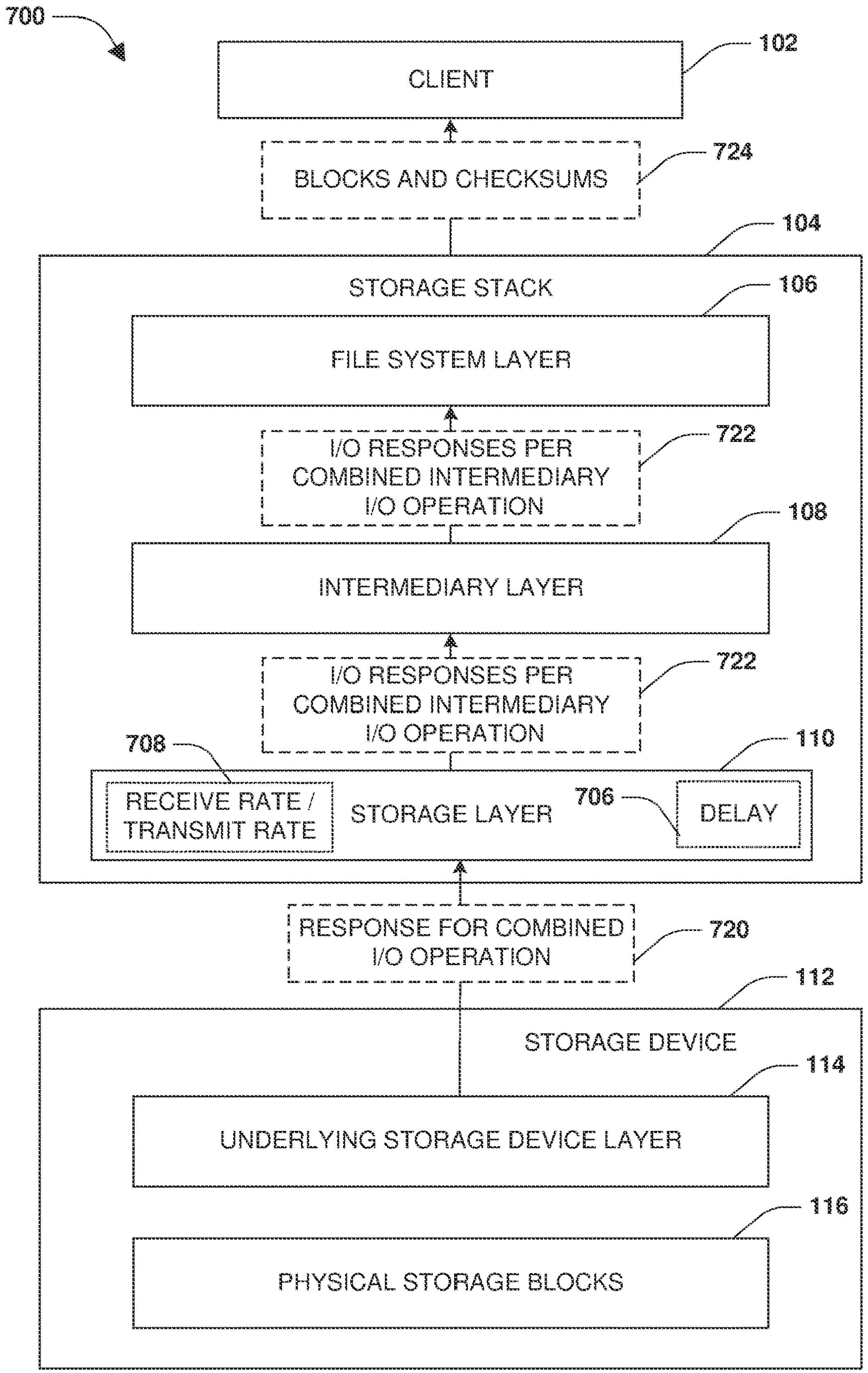
FIG. 7B is a block diagram illustrating an example of a storage stack processing a response from a storage device in accordance with an embodiment of the present technology.

FIG. 7B is a block diagram illustrating an example of a storage stack processing a response from a storage device in accordance with an embodiment of the present technology. The storage layer 110 may receive a response 720 from the underlying storage device layer 114 corresponding to the underlying storage device layer 114 executing the single combined I/O operation 710 upon the storage device 112. The storage layer 110 may extract data and/or checksum blocks from the response 720, and construct individual I/O responses for each of the combined intermediary I/O operations so that the I/O responses include the data and/or checksum blocks requested by the corresponding combined intermediary I/O operations. The storage layer 110 may route the I/O responses 722 through the storage stack 104 back to the client 102 as the blocks and checksums 724 requested by the client 102.

Figure 8:
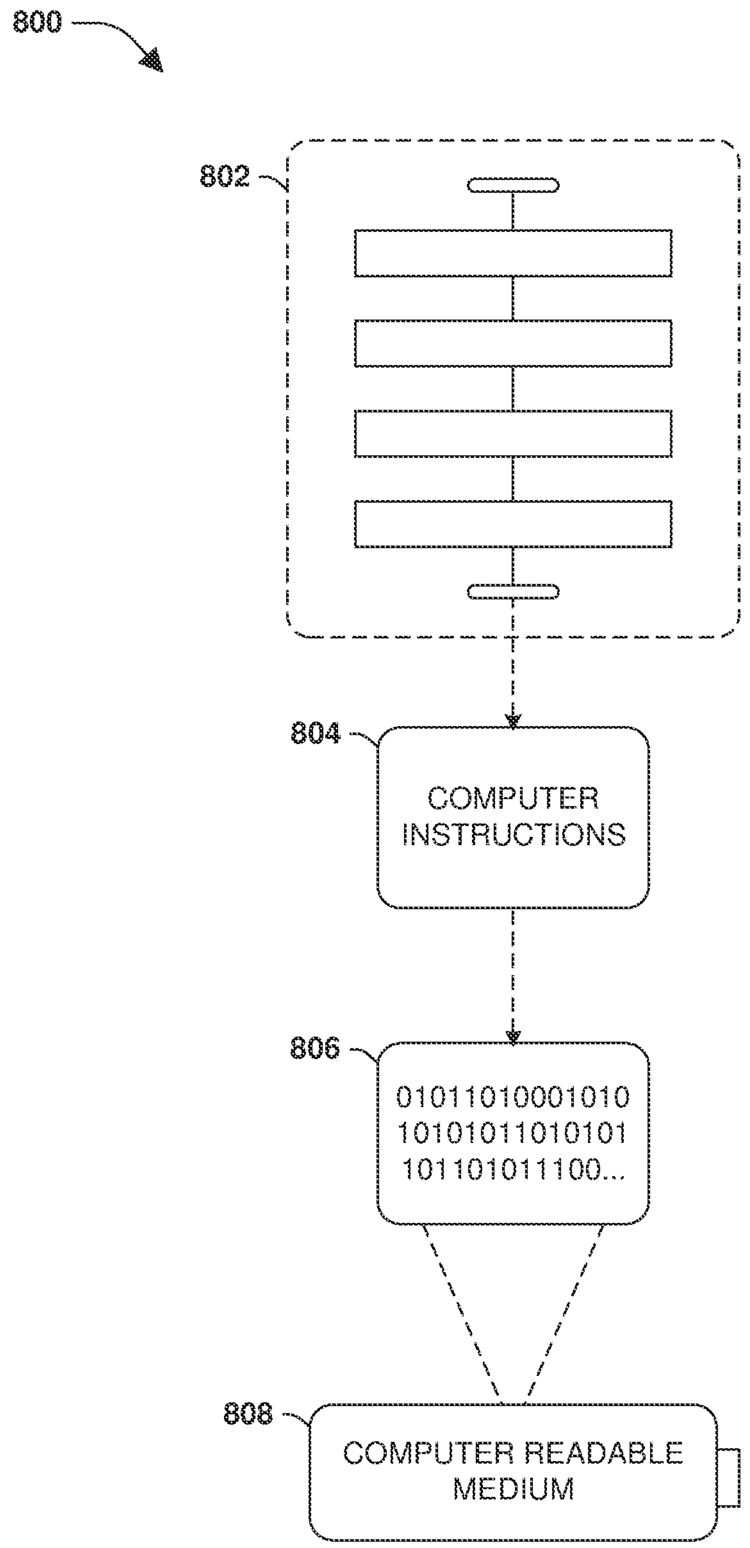
FIG. 8 is an example of a computer readable medium in which various embodiments of the present technology may be implemented.

FIG. 8 is an example of a computer readable medium 800 in which various embodiments of the present technology may be implemented. An example embodiment of a computer-readable medium or a computer-readable device that is devised in these ways is illustrated in FIG. 8, wherein the implementation comprises a computer-readable medium 808, such as a compact disc-recordable (CD-R), a digital versatile disc-recordable (DVD-R), flash drive, a platter of a hard disk drive, etc., on which is encoded computer-readable data 806. This computer-readable data 806, such as binary data comprising at least one of a zero or a one, in turn comprises processor-executable computer instructions 804 configured to operate according to one or more of the principles set forth herein. In some embodiments, the processor-executable computer instructions 804 are configured to perform at least some of the exemplary methods 802 disclosed herein, such as method 300 of FIG. 3 and/or method 600 of FIG. 6, for example. In some embodiments, the processor-executable computer instructions 804 are configured to implement a system, such as at least some of the exemplary systems disclosed herein, such as system 100 of FIGS. 1A-1E, system 200 of FIG. 2, system 400 of FIGS. 4A and 4B, system 500 of FIGS. 5A and 5B, and/or system 700 of FIGS. 7A and 7B, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, magnetic tape, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein.

Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system, comprising:

one or more processors; and a non-transitory computer-readable medium, coupled to the one or more processors, having stored therein instructions that when executed by the one or more processors cause the one or more processors to:

receive a first I/O operation targeting a set of data blocks of a storage device and a second I/O operation targeting checksums for the set of data blocks, wherein the checksums are stored in a checksum block;

combine the first I/O operation and the second I/O operation into a combined I/O operation targeting the set of data blocks and the checksums; and transmit the combined I/O operation to access the set of data blocks, and the checksums from the storage device.

2. The system of claim 1, embodying a set of instructions, which when executed by the one or more processors further cause the one or more processors to:

determine that the set of data blocks and the checksum block form a dis-contiguous set of data blocks within the storage device; and in response to determining that set of data blocks and the checksum block form the dis-contiguous set of data blocks, combine the first I/O operation and the second I/O operation into the combined I/O operation.

3. The system of claim 1, embodying a set of instructions, which when executed by the one or more processors further cause the one or more processors to:

in response to determining that a plurality of I/O operations are not being received at the rate faster than the rate at which the plurality of I/O operations are being transmitted, refrain from combining the combined I/O operation with other I/O operations, wherein the combined I/O operation is transmitted to an underlying storage device layer.

4. The system of claim 1, embodying a set of instructions, which when executed by the one or more processors further cause the one or more processors to:

receive the first I/O operation at a storage stack.

5. The system of claim 1, embodying a set of instructions, which when executed by the one or more processors further cause the one or more processors to:

store, in a zone, the set of data blocks and the checksum block.

6. The system of claim 1, wherein a second checksum block, for a second set of data, is stored in a second zone different from a zone storing the checksum block.

7. The system of claim 1, embodying a set of instructions, which when executed by the one or more processors further cause the one or more processors to route I/O operations through an intermediary layer to a storage layer.

8. The system of claim 1, embodying a set of instructions, which when executed by the one or more processors further cause the one or more processors to:

combine a plurality of I/O operations targeting data blocks and checksum blocks of the storage device into a single combined I/O operation; and transmit the single combined I/O operation to access the data blocks and the checksum blocks in the storage device.

9. The system of claim 1, embodying a set of instructions, which when executed by the one or more processors further cause the one or more processors to:

receive a response to the combined I/O operation; and transmit a first I/O response for the first I/O operation and a second I/O response for the second I/O operation.

10. The system of claim 1, embodying a set of instructions, which when executed by the one or more processors further cause the one or more processors to:

generate a delay between receiving and transmitting I/O operations to the storage device, and accumulate one or more I/O operations during the delay in order to combine the one or more I/O operations into a single combined I/O operation to transmit to the storage device.

11. The system of claim 1, embodying a set of instructions, which when executed by the one or more processors further cause the one or more processors to:

generate a delay between receiving and transmitting I/O operations to the storage device, and accumulate one or more I/O operations during the delay in order to combine the one or more I/O operations into a single combined I/O operation; and adjust the delay to either increase or decrease the delay.

12. The system of claim 1, embodying a set of instructions, which when executed by the one or more processors further cause the one or more processors to:

adjust a delay to combine one or more I/O operations into a single combined I/O operation, wherein the delay is adjusted based upon at least one of a number of I/O operations being received during the delay or a round trip time latency between a storage layer and an underlying storage device layer.

13. The system of claim 1, embodying a set of instructions, which when executed by the one or more processors further cause the one or more processors to:

combine a read I/O operation and a write I/O operation into a single combined I/O operation to transmit to the storage device.

14. A method comprising:

receiving a first I/O operation targeting a set of data blocks of a storage device and a second I/O operation targeting checksums for the set of data blocks, wherein the checksums are stored in a checksum block;

combining the first I/O operation and the second I/O operation into a combined I/O operation targeting the set of data blocks and the checksums; and transmitting the combined I/O operation to access the set of data blocks, and the checksums from the storage device.

15. The method of claim 14, further comprising:

receiving a response to the combined I/O operation from the storage device; and transmitting separate I/O responses in response to the first I/O operation and the second I/O operation.

16. A non-transitory machine readable medium comprising instructions, which when executed by a machine, causes the machine to:

receive a first I/O operation targeting a set of data blocks of a storage device and a second I/O operation targeting checksums for the set of data blocks, wherein the checksums are stored in a checksum block;

combine the first I/O operation and the second I/O operation into a combined I/O operation targeting the set of data blocks and the checksums; and transmit the combined I/O operation to access the set of data blocks, and the checksums from the storage device.

17. The non-transitory machine readable medium of claim 16, wherein the instructions cause the machine to:

receive a response to the combined I/O operation from an underlying storage device layer; and transmit, by a storage layer, separate I/O responses through a storage stack in response to the first I/O operation and the second I/O operation.

* * * * *